United States Patent
Fine et al.

(10) Patent No.: US 12,493,943 B2
(45) Date of Patent: Dec. 9, 2025

(54) APPARATUSES, SYSTEMS AND METHODS FOR PLUNGER-STOPPER DEPTH MEASUREMENT IN PRE-FILLED SYRINGES

(71) Applicant: AMGEN INC., Thousand Oaks, CA (US)

(72) Inventors: Jordan Ray Fine, Ventura, CA (US); Thomas Clark Pearson, Newbury Park, CA (US); Graham F. Milne, Ventura, CA (US)

(73) Assignee: AMGEN INC., Thousand Oaks, CA (US)

( * ) Notice: Subject to any disclaimer, the term of this patent is extended or adjusted under 35 U.S.C. 154(b) by 0 days.

(21) Appl. No.: 18/692,360

(22) PCT Filed: Sep. 28, 2022

(86) PCT No.: PCT/US2022/045008
§ 371 (c)(1),
(2) Date: Mar. 15, 2024

(87) PCT Pub. No.: WO2023/055780
PCT Pub. Date: Apr. 6, 2023

(65) Prior Publication Data
US 2025/0139756 A1    May 1, 2025

Related U.S. Application Data

(60) Provisional application No. 63/249,849, filed on Sep. 29, 2021.

(51) Int. Cl.
*G06T 7/00*    (2017.01)
*A61M 5/178*    (2006.01)
(Continued)

(52) U.S. Cl.
CPC .......... *G06T 7/0004* (2013.01); *A61M 5/178* (2013.01); *G01F 11/021* (2013.01);
(Continued)

(58) Field of Classification Search
CPC . H04N 23/73; H04N 23/74; A61M 2205/502; A61M 5/1408; A61M 5/1456;
(Continued)

(56) References Cited

U.S. PATENT DOCUMENTS 5,651,775 A * 7/1997 Walker .............. A61M 5/31533
                                                    604/207
9,881,367 B1 * 1/2018 Milne ....................... G06T 7/11
(Continued)

FOREIGN PATENT DOCUMENTS

WO    WO-2015143058 A1 *  9/2015 ............ A61M 5/007
WO    WO-2019/032101 A1    2/2019
WO    WO-2022/225736 A1    10/2022

OTHER PUBLICATIONS

"Automated Machine Vision System for Liquid Particle Inspection of Pharmaceutical Injection"—Zhang et al., IEEE Transactions on Instrumentation and Measurement, vol. 67, No. 6, Jun. 2018 (Year: 2018).*
(Continued)

*Primary Examiner* — Mainul Hasan
(74) *Attorney, Agent, or Firm* — MARSHALL, GERSTEIN & BORUN LLP

(57) ABSTRACT

Automatic prefilled syringe inspection systems, apparatus and methods are provided. The automatic syringe inspection systems, apparatus and methods may determine a plunger depth within a syringe that has been pre-filled with a medication. The plunger depth may be based on digital
(Continued)

image data that is representative of a silhouette of at least a portion of a tubular vessel and at least a portion of a plunger within the tubular vessel.

19 Claims, 22 Drawing Sheets

(51) Int. Cl.
    *G01F 11/02*     (2006.01)
    *G01F 23/292*     (2006.01)
    *G06T 7/50*     (2017.01)
    *H04N 23/73*     (2023.01)
    *H04N 23/74*     (2023.01)

(52) U.S. Cl.
    CPC .............. *G01F 23/292* (2013.01); *G06T 7/50* (2017.01); *H04N 23/73* (2023.01); *H04N 23/74* (2023.01)

(58) Field of Classification Search
    CPC ...... A61M 5/1458; A61M 5/178; A61M 5/19; A61M 5/31573; A61M 5/3298; A61M 5/427
    See application file for complete search history.

(56) References Cited

U.S. PATENT DOCUMENTS

| | | | |
|---|---|---|---|
| 2006/0178578 A1* | 8/2006 | Tribble | B65B 3/003 |
| | | | 382/128 |
| 2009/0188311 A1* | 7/2009 | Cadieux | A61M 5/14546 |
| | | | 73/149 |
| 2016/0055649 A1* | 2/2016 | Peret | H04N 7/183 |
| | | | 348/135 |
| 2017/0056603 A1* | 3/2017 | Cowan | A61M 5/14546 |
| 2019/0156697 A1* | 5/2019 | Trovato | G09B 19/003 |
| 2021/0283337 A1* | 9/2021 | Ketelaars | B65B 3/006 |
| 2024/0295502 A1* | 9/2024 | Kelly | G01N 21/90 |

OTHER PUBLICATIONS

International Search Report for Application No. PCT/US2022/045008 dated Dec. 21, 2022.

International Written Opinion for Application No. PCT/US2022/045008 dated Dec. 21, 2022.

\* cited by examiner

APPARATUSES, SYSTEMS AND METHODS FOR PLUNGER-STOPPER DEPTH MEASUREMENT IN PRE-FILLED SYRINGES

CROSS-REFERENCE TO RELATED APPLICATION

This is the United States national phase of International Patent Application No. PCT/US2022/045008, filed Sep. 28, 2022, which claims priority to U.S. Provisional Patent Application No. 63/249,849, filed Sep. 29, 2021, the entire contents of each of which are hereby incorporated by reference herein.

FIELD OF DISCLOSURE

The present disclosure generally relates to automatic inspection of prefilled syringes. More specifically, the present disclosure relates to automatic inspection of prefilled syringes based on image data that is representative of a silhouette of at least a portion of a syringe flange and at least a portion of a plunger within a syringe barrel.

BACKGROUND

Numerous drug products are manufactured and stored in syringes. Associated prefilled syringes may be manufactured to high quality standards. Prefilled syringes often include a plunger that fits tightly within a cylindrical tube called a barrel. A proximal end of the syringe may be fitted with a hypodermic needle, a nozzle or tubing to direct flow of, for example, a medicament into and/or out of the barrel. As often used in the context of drug delivery, "distal" is generally meant herein as being away from a patient, and "proximal" as toward the patient, when the prefilled syringe is in use.

Pre-filled syringes often have unique post-stoppering plunger depth requirements. For example, a plunger depth may be based on syringe physical properties, a medicament within the prefilled syringe, a fill volume, etc. Thus, for any given prefilled syringe, an associated plunger may be disposed in a syringe barrel at a predetermined depth. Because a plunger depth may be a controlled variable in an associated process, a post-stoppering prefilled syringe inspection may include determining an actual plunger depth within a respective syringe barrel using a machine vision system. Variations from one syringe to another (e.g., variations in physical dimension(s), variations in optical transmissivity, etc.) and/or from one plunger to another may result in artifacts within an image of a plurality of prefilled syringes while the prefilled syringes are illuminated with a backlight.

Prefilled syringes are often placed in associated trays (e.g., preformed trays, trays available from RONDO OF AMERICA, INC., 209 Great Hill Road, Naugatuck, CT 06770, etc.) for packaging, storing, transporting, etc. A tray may be, for example, vacuum molded from an at least partially opaque plastic material. While a tray is not typically 100% opaque, an image of a plurality of, backlit, prefilled syringes within a tray may appear as though the tray is a neutral density optical filter including optical filter material that is not homogeneously distributed within the tray material. Thus, an image of a tray of prefilled syringes in a tray, while the prefilled syringes are illuminated with a backlight may, for example, include artifacts resulting from the tray. Tray induced image artifacts often result in erroneous plunger depth determination in known digital image based syringe inspection systems.

Apparatuses, systems and methods are needed that generate digital image data which is representative of a silhouette of at least a portion of a syringe and at least a portion of a plunger within a barrel of the syringe. Apparatuses, systems and methods are also needed that perform automatic prefilled syringe inspection based on the digital image data.

SUMMARY

A method to measure plunger depth in prefilled syringes may include providing a plurality of prefilled syringes that are at least partially encapsulated by packaging that obscures inspection lighting. The method may also include providing lighting conditions that overcome or circumvent packaging related obscurities.

In another embodiment, a system for inspecting tubular vessels post stoppering may include a digital image data acquisition device and a digital image processing engine. At least a portion of the tubular vessel may be at least partially transparent. The digital image data acquisition device may include an image sensor and a backlight. The digital image data acquisition device may be configured to cause the backlight to emit light having a predetermined intensity. The digital image data acquisition device may also be configured to acquire image data from the image sensor while at least a portion of the tubular vessel and at least a portion of the plunger are positioned between the image sensor and the backlight while the backlight emits light. The image data may be representative of a silhouette of at least the portion of the tubular vessel and at least the portion of the plunger within the tubular vessel. The system may also include a digital image processing engine configured to determine a depth of the plunger within the tubular vessel based on the image data.

In a further embodiment, a method of inspecting a tubular vessel may include providing a plurality of tubular vessels in a tray and an intermediate holder. The method may also include aligning the intermediate holder with the tray and transferring the plurality of tubular vessels from the tray to the intermediate holder. The method may further include placing the plurality of tubular vessels and the intermediate holder between an image sensor and a backlight. The method may yet further include acquiring image data from the image sensor while at least a portion of the tubular vessel and at least a portion of the plunger are positioned between the image sensor and the backlight while the backlight emits light at a predetermined intensity. The image data may be representative of a silhouette of at least the portion of the tubular vessel and at least a portion of a plunger within the tubular vessel.

In yet a further embodiment, a non-transitory computer-readable medium may include computer-readable instructions stored thereon that, when executed by a processor, cause the processor to implement a tubular vessel inspection post stoppering. At least a portion of the tubular vessel may be at least partially transparent. The computer-readable medium may include a backlight control module that, when executed by the processor, may cause the processor to cause a backlight to emit light having a predetermined intensity. The computer-readable medium may also include a digital image data acquisition module that, when executed by the processor, may cause the processor to acquire image data from an image sensor while at least a portion of the tubular vessel and at least a portion of a plunger within the tubular vessel are positioned between the image sensor and the backlight while the backlight emits light. The image data may be representative of a silhouette of at least the portion of the tubular vessel and the at least the portion of the plunger.

BRIEF DESCRIPTION OF THE DRAWINGS

It is believed that the disclosure will be more fully understood from the following description taken in conjunction with the accompanying drawings. Some of the drawings may have been simplified by the omission of selected elements for the purpose of more clearly showing other elements. Such omissions of elements in some drawings are not necessarily indicated of the presence or absence of particular elements in any of the exemplary embodiments, except as may be explicitly delineated in the corresponding written description. Also, none of the drawings are necessarily to scale.

Figure 1:
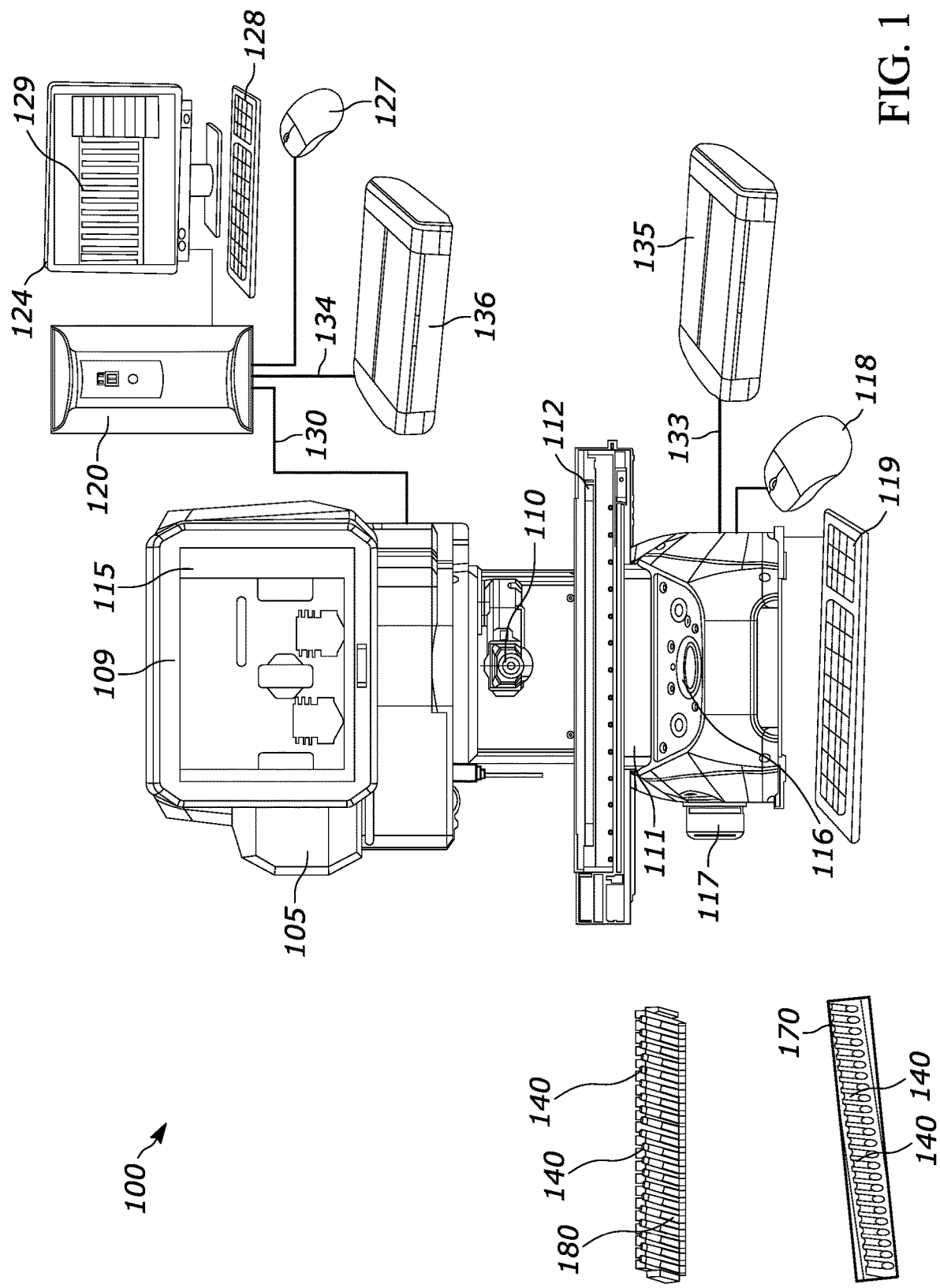
FIG. 1 depicts an example prefilled syringe inspection system.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercial feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Apparatuses, systems and methods are provided that may generate digital image data which may be, for example, representative of a silhouette of at least a portion of a syringe and at least a portion of a plunger within a barrel of the syringe. Apparatuses, systems and methods are also provided that may, for example, perform automatic prefilled syringe inspection based on the digital image data (e.g., determine a plunger depth within a prefilled syringe, determine an air gap height within a prefilled syringe, etc.).

Post-stoppering inspection of pre-filled syringes (e.g., pre-filled 1 mL syringes, pre-filled 0.5 mL (Terumo) syringes, pre-filled 2.25 mL syringes, 5 mL cartridges, etc.) may include measuring a depth that an associated plunger is inserted in a syringe barrel. The depth of the plunger in the syringe barrel may be unique for each given drug product based on syringe physical variables, syringe optical properties, plunger physical properties, a syringe fill volume, etc. If an associated inspection system determines that a plunger is at an incorrect depth within the prefilled syringe, the inspection system may determine that the prefilled syringe failed inspection.

Automated syringe measurement systems may be, for example, more precise and accurate than manual measurement methods. Additionally, using an automated prefilled syringe inspection system may automatically and securely record quality data and batch numbers. Further, an automated prefilled syringe inspection system may process more syringes per minute than manual measurement techniques. Automated inspection systems in accordance with the present disclosure may require fewer operating personnel compared to manual inspection. As a result, automated syringe inspection systems of the present disclosure may improve prefilled syringe quality control procedures.

With reference to FIG. 1, a tubular vessel (e.g., a prefilled syringe, etc.) inspection system 100 may include a digital image data acquisition device 105 (e.g., a Keyence IM-7030, available from Keyence Corporation of America, 500 Park Boulevard, Suite 200, Itasca, Il 60143; a PID TRPT-031206 vision system; a DASI vision system; etc.). In addition to acquiring digital image data, the digital image data acquisition device 105 may also be, for example, configured to determine a plunger depth within an associated prefilled syringe based on the digital image data. Commonly assigned U.S. Pat. No. 9,881,367, the disclosure of which is incorporated in its entirety herein by reference, discloses details of exemplary options for determining a plunger depth within an associated prefilled syringe based on digital image data.

The digital image data acquisition device 105 may include a digital camera 110 (e.g., a camera including a CMOS image sensor, a 1" 6.6 mega pixel monochrome CMOS image sensor, a CCD imaging sensor, etc.), a backlight 111 (e.g., an infrared light emitting backlight, a backlight that emits light having a 850 nm wavelength, etc.), a stage 112, a display device 109 having a user interface display 115, a user control panel 116, a manual imaging surface/camera orientation/focus control 117, a mouse 118, a keyboard 119, and a printer 135 communicatively connected via a link 133. The digital camera 110 may include, for example, a 11.81"× 7.87" (4×R50) field of view or a 8.86"×4.92" high precision mode field of view.

As described in detail herein, the digital image acquisition device 105 may be configured to, for example, cause the backlight 111 to emit light having a predetermined wavelength and/or intensity, and acquire image data from an image sensor 110 while at least a portion of a tubular vessel 140 and at least a portion of a plunger 150 are positioned between the image sensor 110 and the backlight 111 while the backlight 111 emits light.

As described in detail herein, a plurality of prefilled syringes 140 may be held within a tray 170 or an intermediate holder 180. When the prefilled syringes 140 are held within a tray 170, at least a portion of the tray 170 may be between the prefilled syringes 140 and an associated backlight 110. When the prefilled syringes 140 are held within an intermediate holder 180, at least a portion of a space between the between the prefilled syringes 140 and an associated backlight 110 may be optically unimpeded. Relatedly, a backlight 111 may emit a lower intensity of light when using an intermediate holder 180 compared to an intensity when using a tray 170.

The tubular vessel inspection system 100 may also include a remote device 120 communicatively connected to the digital image data acquisition device 105 via a network 130. The remote device 120 may include a display device 124 with a user interface 129, a keyboard 128, a mouse 127, and a printer 136 communicatively connected via a link 134. As described in detail herein, the remote device 120 may be, for example, configured to receive digital image data and/or prefilled syringe inspection data, and may analyze and/or store the digital image data. For example, the tubular vessel inspection system 100 may be configured to determine a depth of a plunger within a tubular vessel based on the image data.

Figure 2:
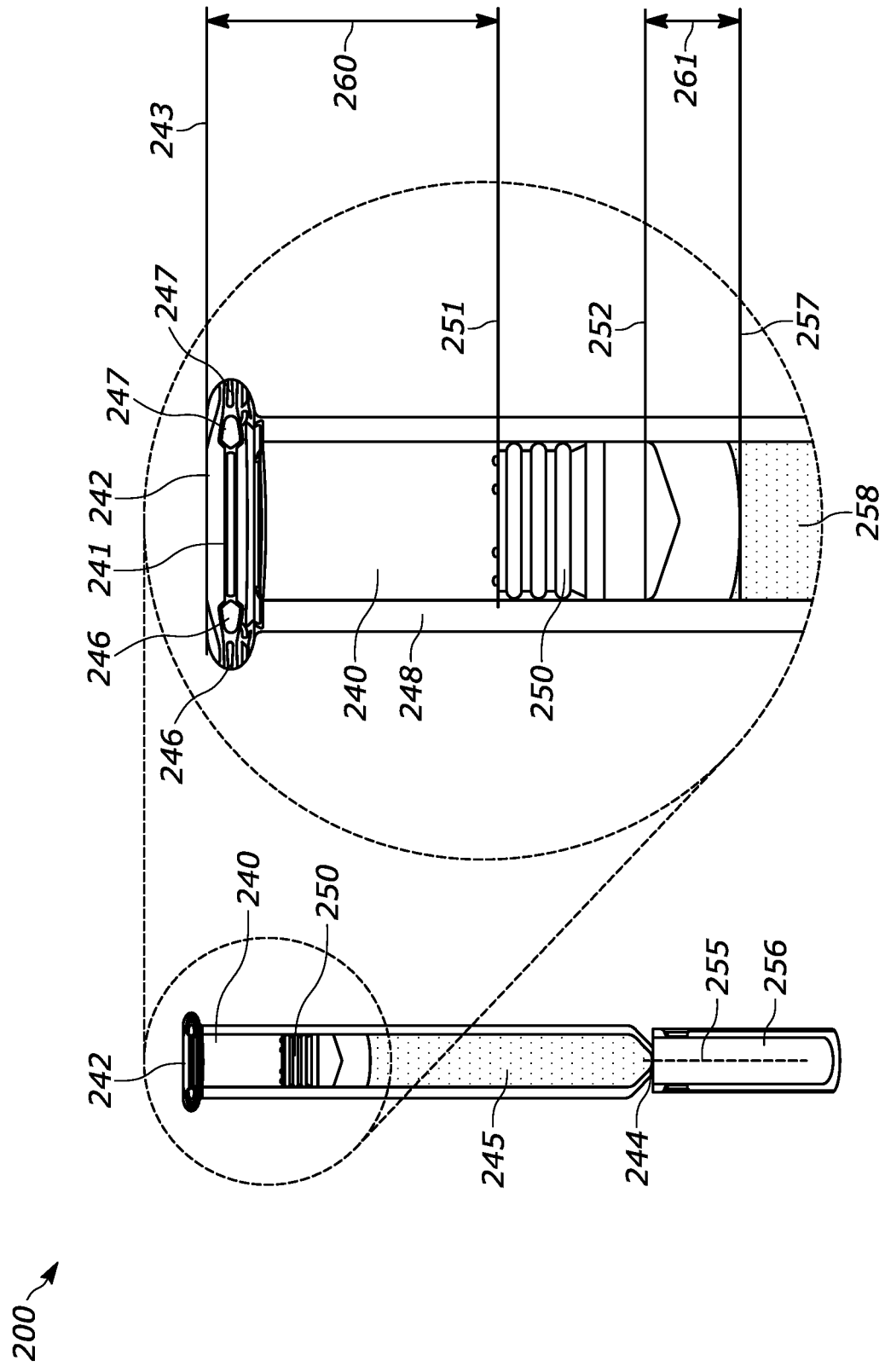
FIG. 2 depicts an illustration of an example prefilled syringe.

Turning to FIG. 2, an illustration 200 of an "optically uniform" prefilled syringe (PFS) 240 post plunger insertion. The PFS 240 may include a needle 255 and a needle cap 256. As shown in the illustration 200, the optically uniform PFS 240 may include a flange 241 defining an open distal end 242. The flange 241 may include optically uniform portions 246, 247. Similarly, the optically uniform PFS 240 may include a syringe barrel 245 having an optically uniform wall 248.

A plunger depth 260 may be, for example, a difference between a distal edge 243 of the syringe flange 241 and a distal edge 251 of the plunger 250. An air gap 261 may be, for example, a difference between a proximal end 252 of the plunger 250 and a distal end 257 of an associated medicament 258 within the syringe 245 with the syringe 245 oriented with a proximal end 244 of the syringe 245 pointed downward toward the ground.

Figure 3:
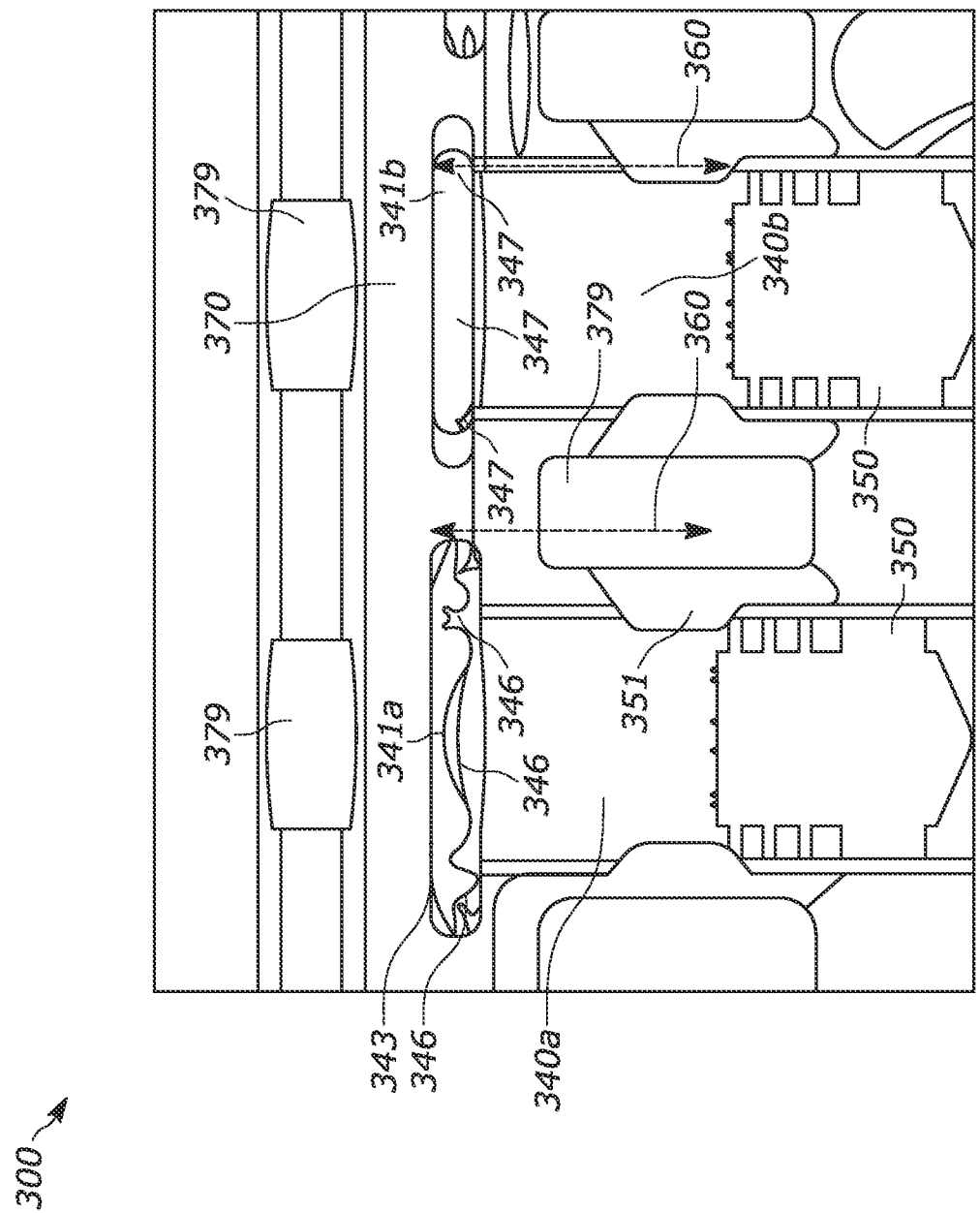
FIG. 3 depicts an example silhouette of portions of two prefilled syringes in a tray.

With reference to FIG. 3, an image 300 of a portion of two prefilled syringes 340a,b within a tray 370 may include syringe artifacts 346, 347 that may, for example, reflect optical variations between the flanges 341a,b of the two prefilled syringes 340a,b. The image 300 may also include tray artifacts 379 that may, for example, reflect optical variations within the tray 370. In any event, the image 300 may be based on, for example, image data that is representative of a silhouette of at least a portion of a plurality of prefilled syringes 340a,b. As described in detail elsewhere herein, the image data may be acquired from an image sensor 110 while at least a portion of the prefilled syringes 340a,b and at least a portion of the plungers 350 are positioned between the image sensor 110 and an associated backlight 111 while the backlight 111 emits light having a predetermined wavelength and/or intensity. Additionally, or alternatively, an integration period of the image sensor 110 may include a predetermined integration period.

As depicted in FIG. 3, a silhouette image 300 may result by having an intensity of a backlight 111 and/or an integration period of an image sensor 110 based on optical characteristics of a syringe flange 341a,b. For example, an associated digital image data acquisition device 105 may include a digital camera 110 having a predetermined integration period and a backlight 111 having a predetermined intensity, such that a silhouette image 300 of any given syringe flange 341a,b will include a respective continuous distal edge 343. As reflected in image 300, light intensity associated with edges of the artifacts 379 is greater than light intensity of both distal edges of the syringe flanges and distal edges of the plungers. As described herein, edge detection parameters and/or associated digital image processing filters may be incorporated within an associated tubular vessel inspection apparatus to, for example, cause the apparatus to disregard any edges of tray artifacts 379 that may, otherwise, trigger false distal syringe flange edge and/or distal plunger edge detection.

Turning to FIGS. 4A-F, a tubular vessel inspection system 400a-f may include a digital image data acquisition device 405a,b,c in communication with a remote device (e.g., a server) 420b,e via a network 430b. The digital image data acquisition device 405a,b,c may be similar to, for example, the digital image data acquisition device 105 of FIG. 1. The remote device 420b,e may be similar to, for example, the remote device 120 of FIG. 1.

The tubular vessel inspection system 400a-f may implement communications between the digital image data acquisition device 405a,b,c and the remote device 420b,e (e.g., a remote server, cloud-based resources, etc.) to provide, for example, prefilled syringe inspection data and/or image data to a digital image-based measurement database 420b.

For example, the tubular vessel inspection system 400a-f may acquire prefilled syringe data (e.g., prefilled syringe physical dimension data, prefilled syringe optical transmission data, prefilled syringe manufacture data, etc.) from, for example, a user of a digital image data acquisition device 405a,b,c. Alternatively, or additionally, while not shown in FIGS. 4A-F, syringe data and/or desired inspection data may be automatically obtained from a third party data source (e.g., a syringe manufacture, a medication manufacturer, etc.). The desired inspection data may include, for example: a backlight intensity, a backlight on signal, an image sensor integration period, a plunger depth threshold, etc. As described in detail herein, the tubular vessel inspection system 400a-f may automatically determine a depth of a plunger within at least one syringe based on, for example, image data that is representative of a silhouette of at least a portion of a syringe flange and a portion of an associated plunger (e.g., image data as visually represented in FIG. 3, etc.).

Figure 4A:
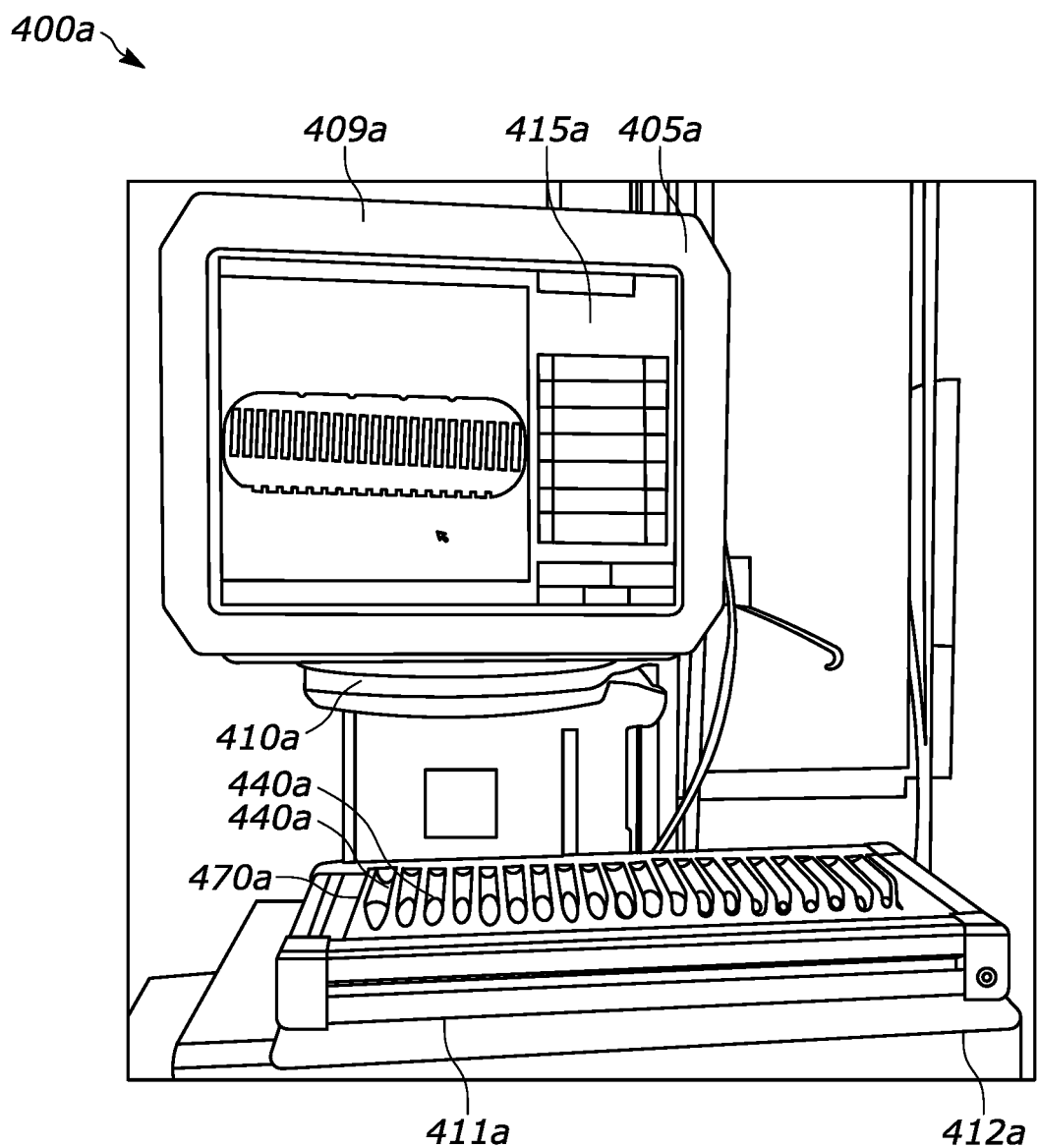
FIGS. 4A-F depict various example prefilled syringe inspection apparatuses, systems, and methods.
Figure 4B:
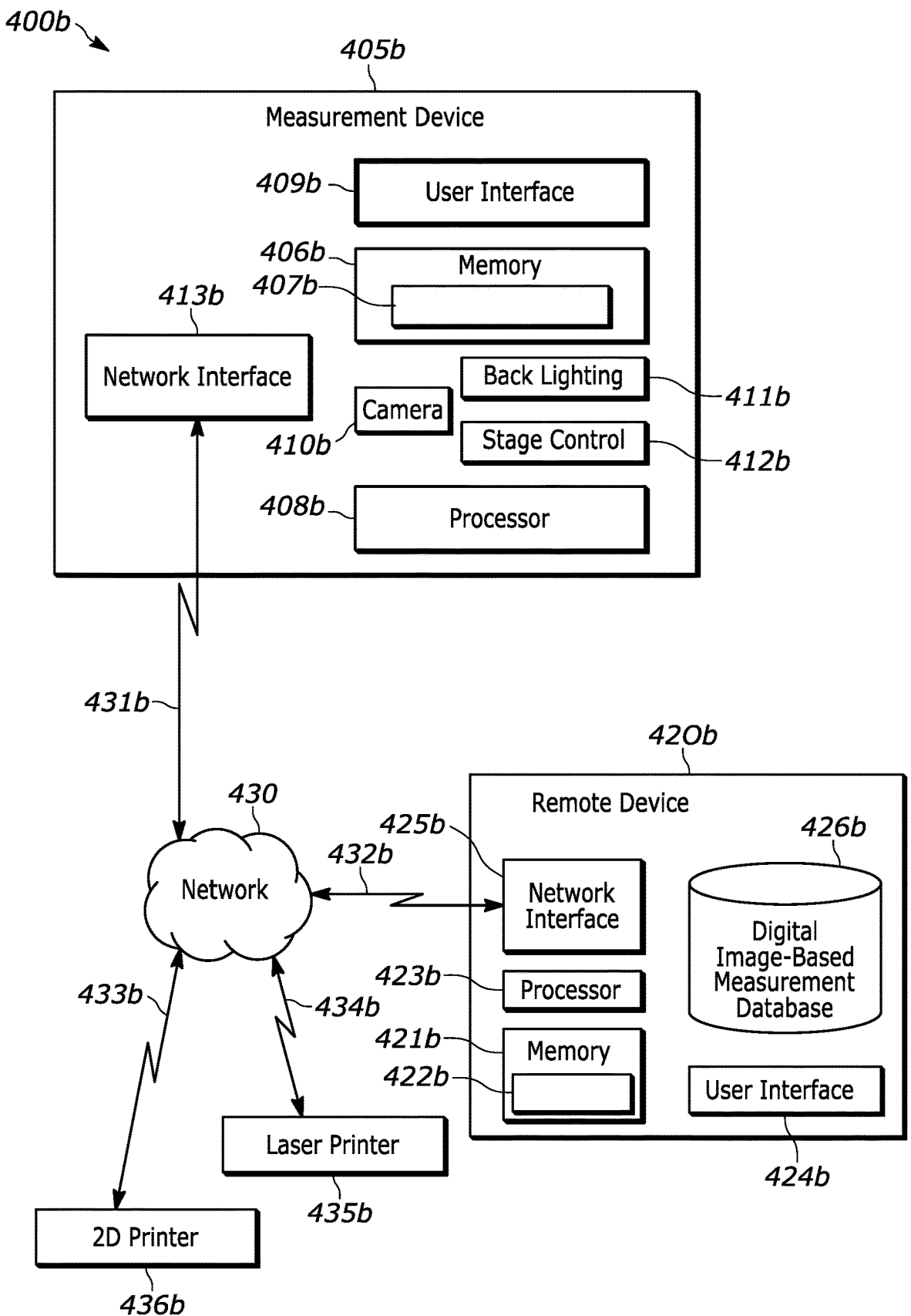
Figure 4C:
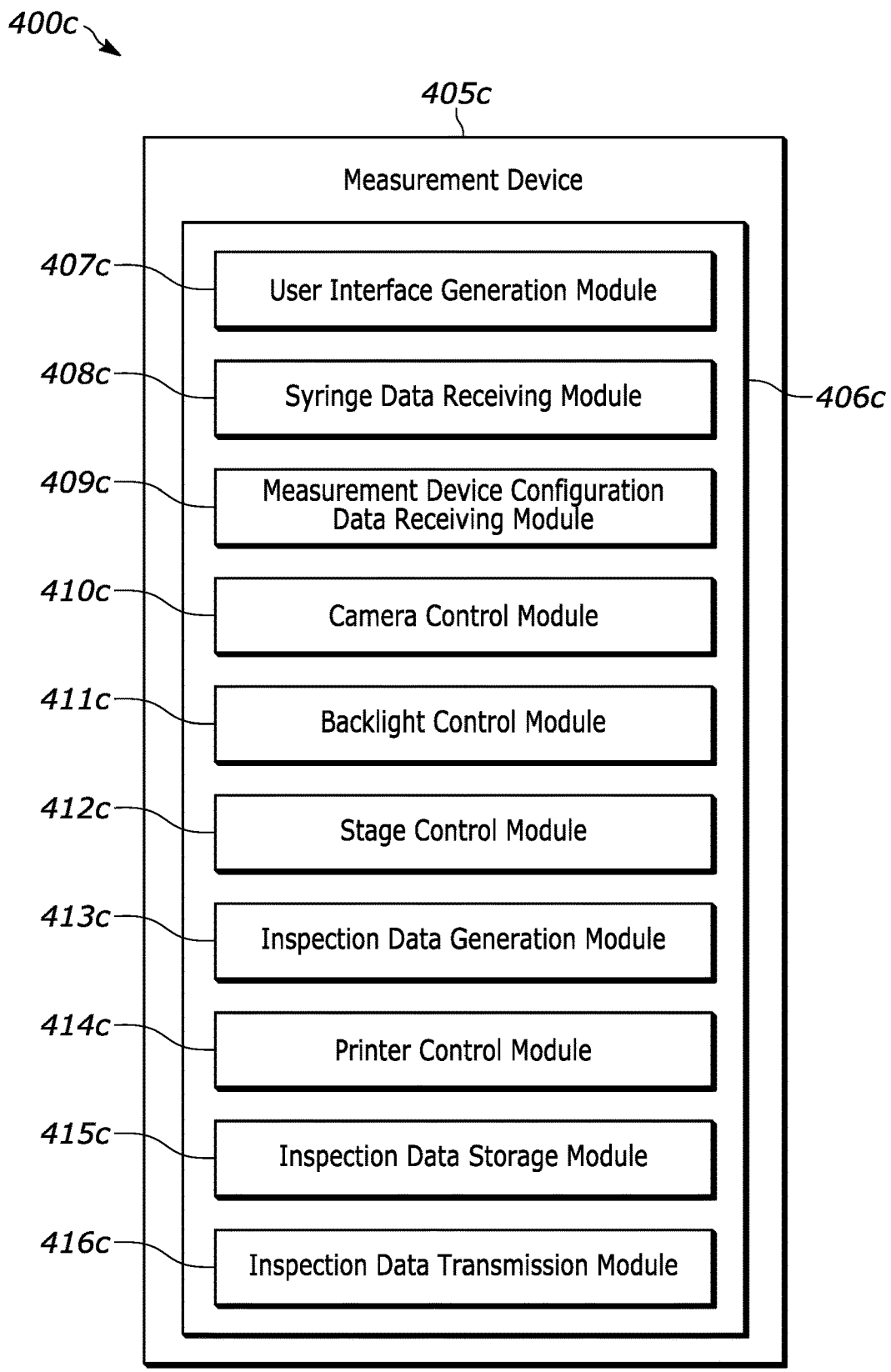
Figure 4D:
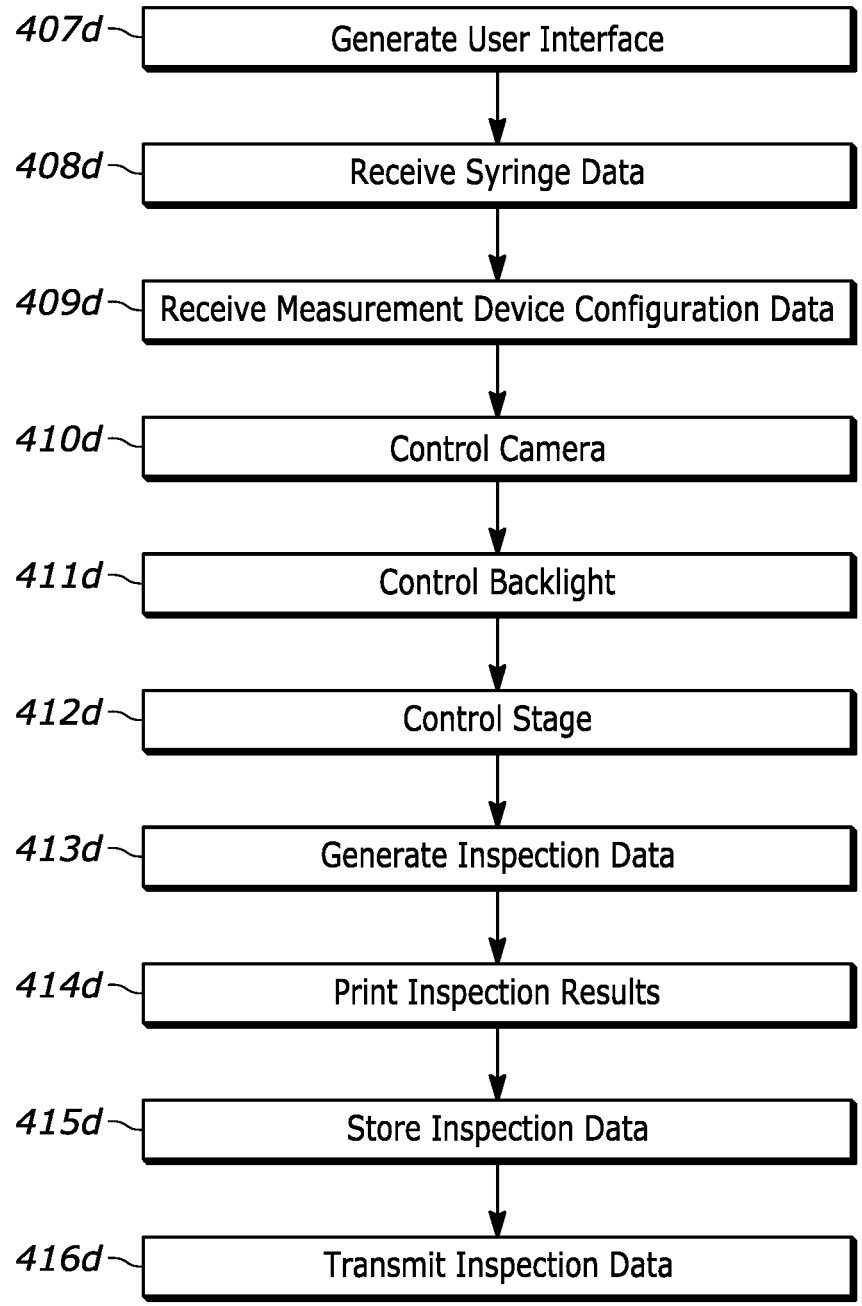
Figure 4E:
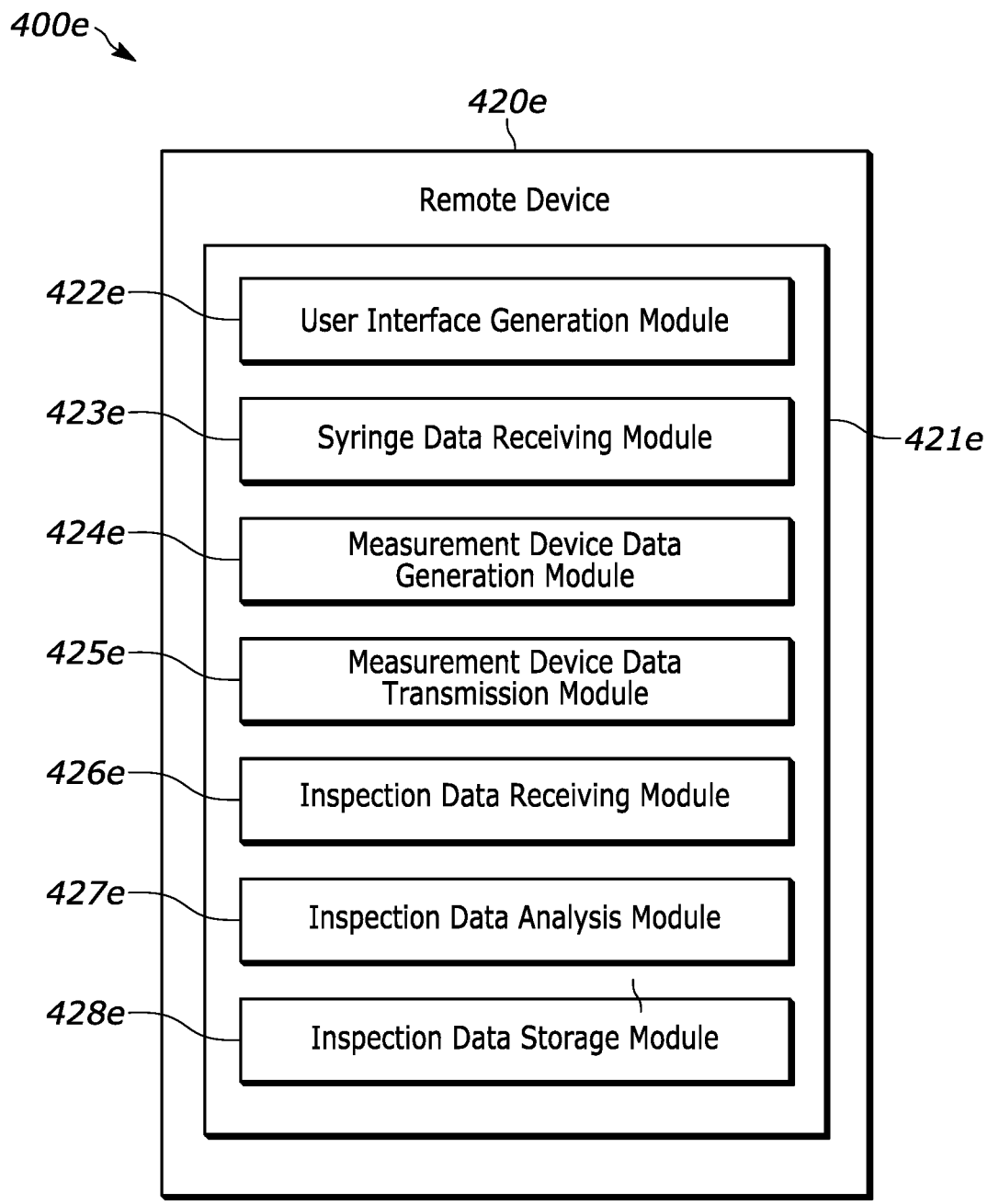
Figure 4F:
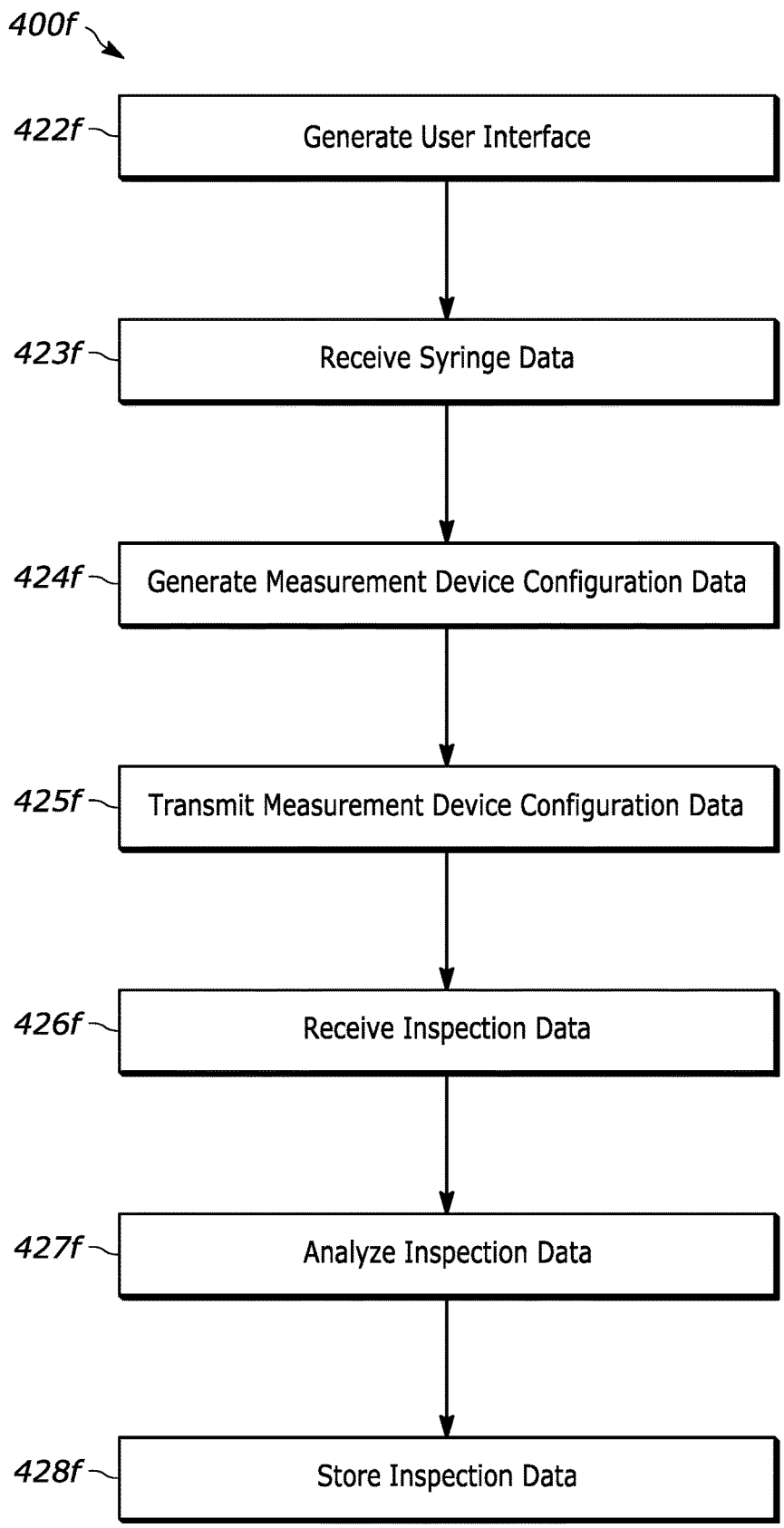
Figure 5A:
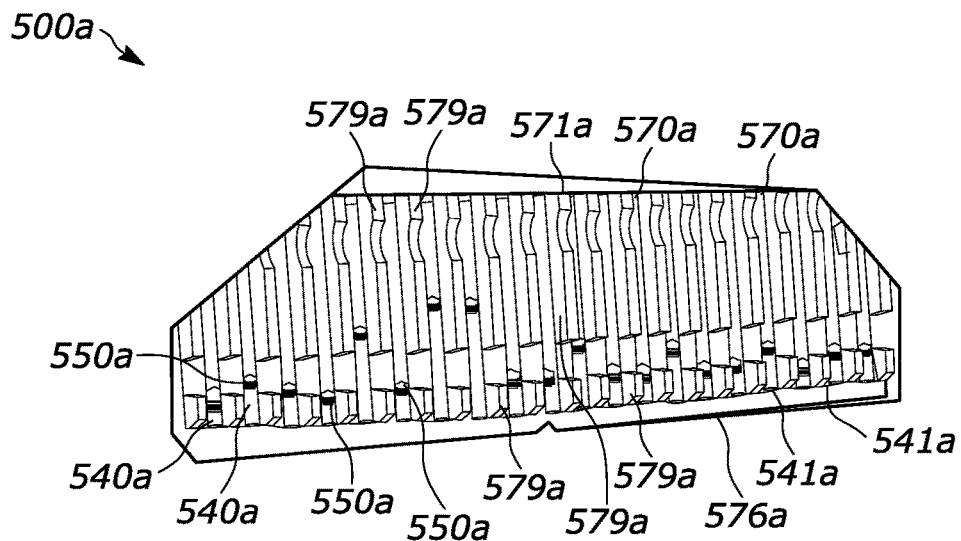
FIGS. 5A-H, J and K depict an example tray of prefilled syringes, an intermediate holder, a removal tool, and method of transferring the prefilled syringes from the tray to the intermediate holder.
Figure 5B:
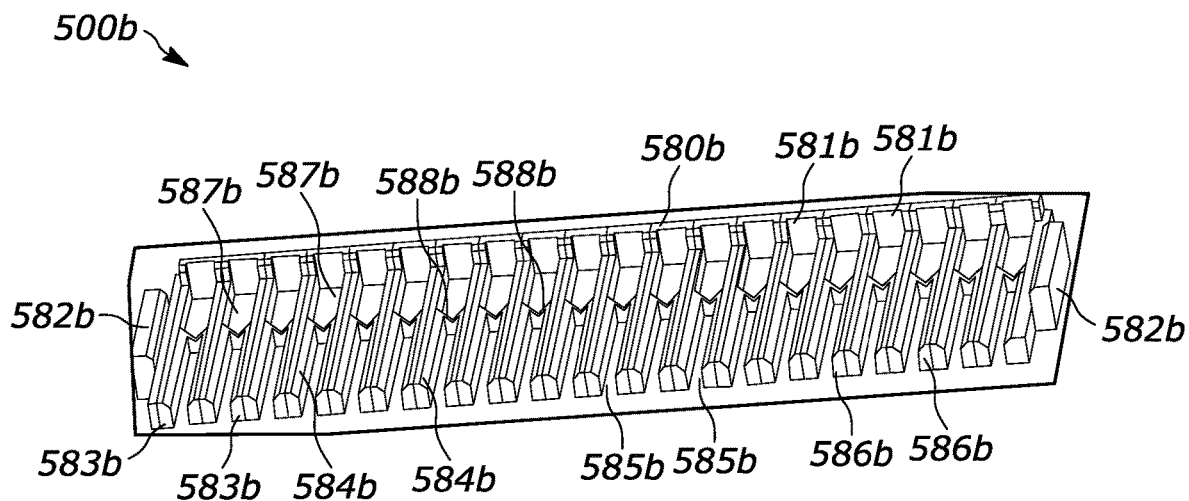
Figure 5C:
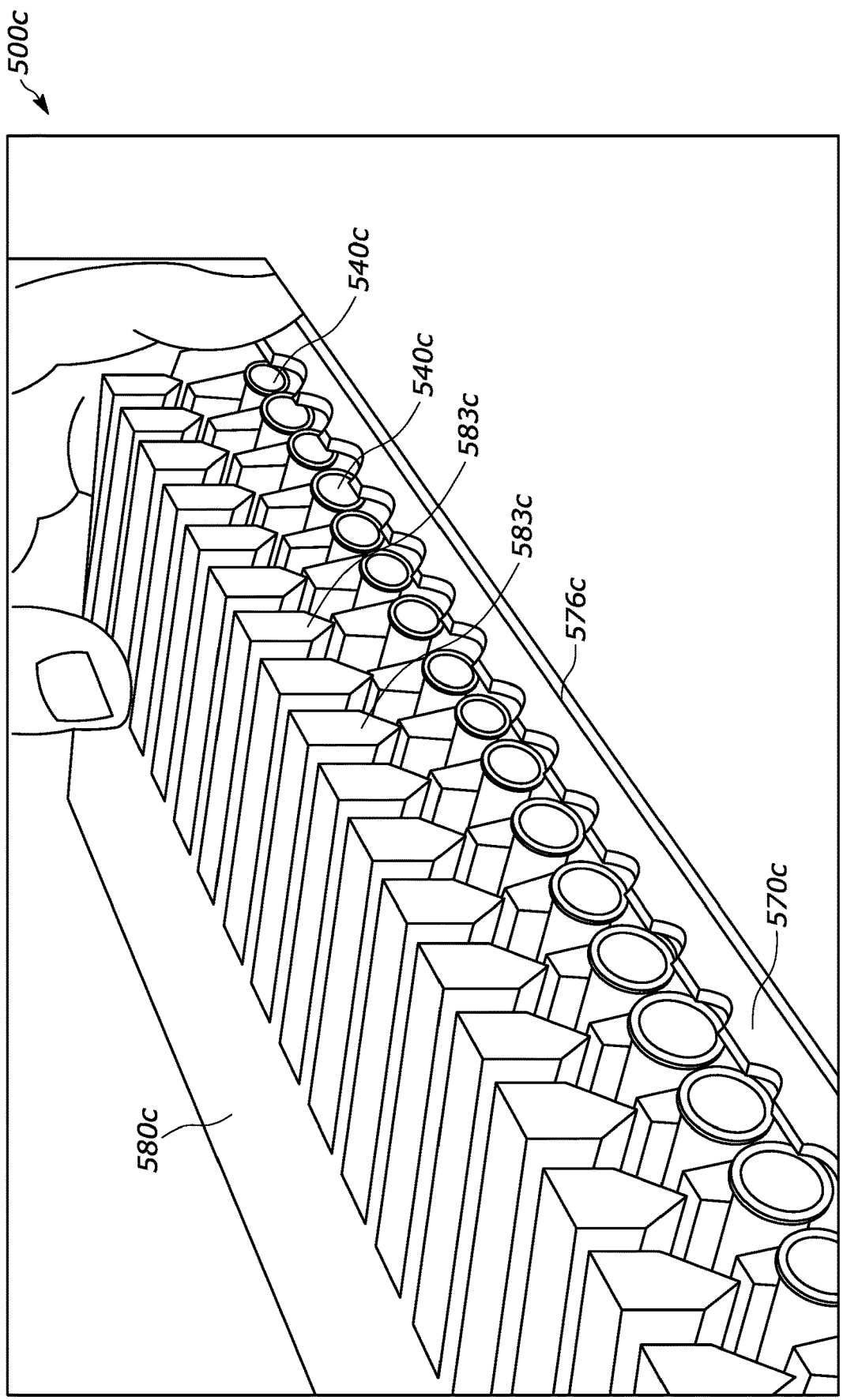
Figure 5D:
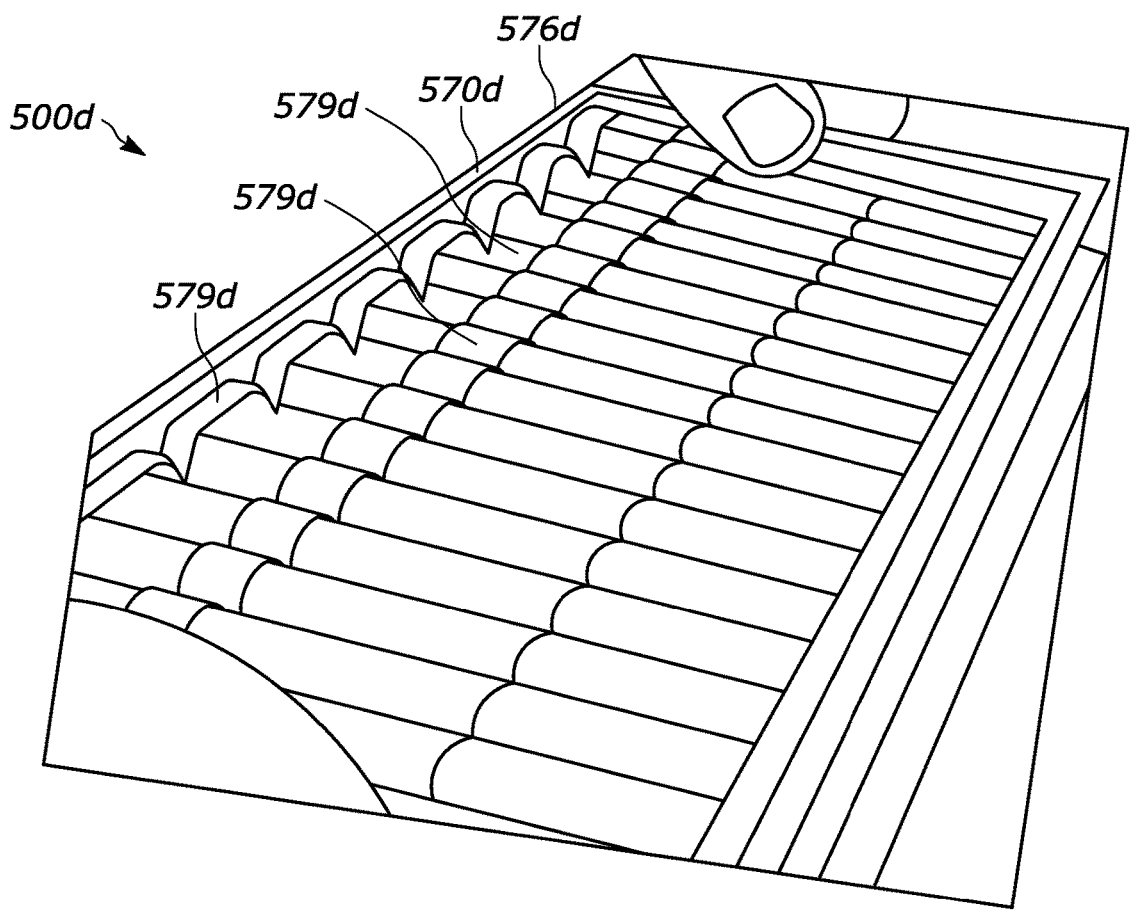
Figure 5E:
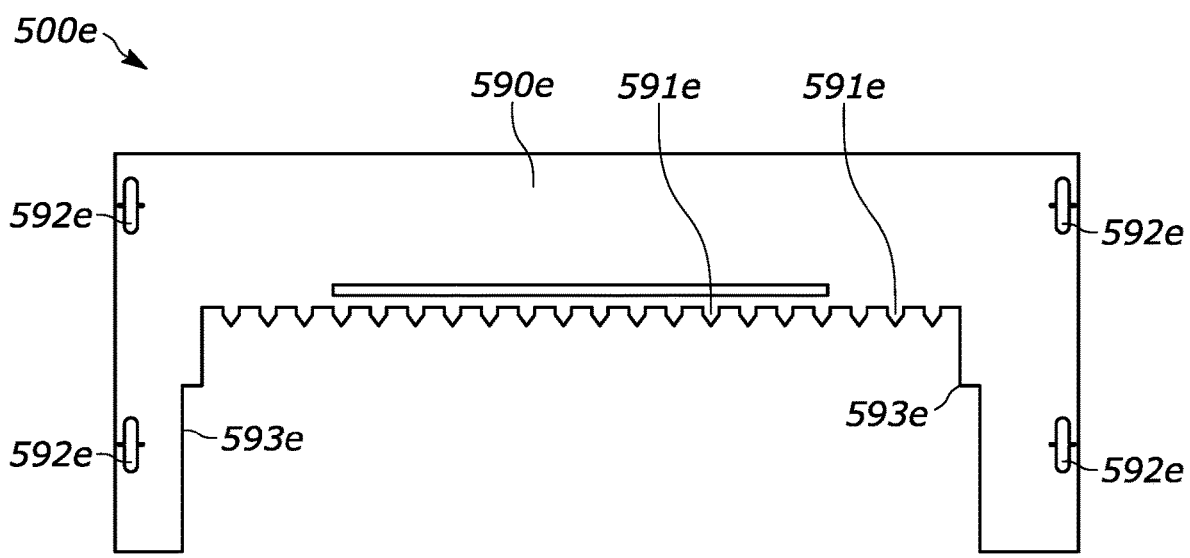
Figure 5F:
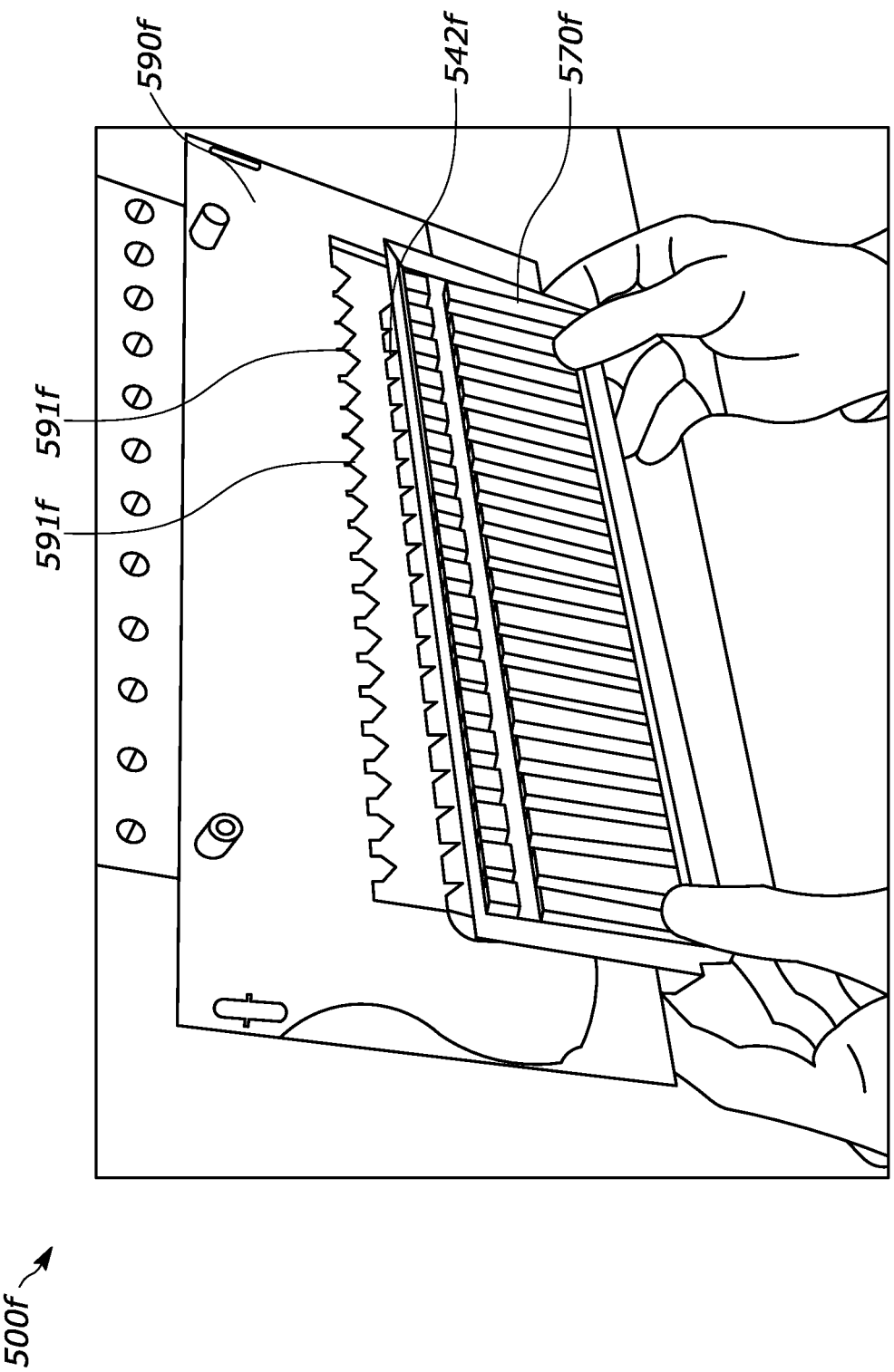
Figure 5G:
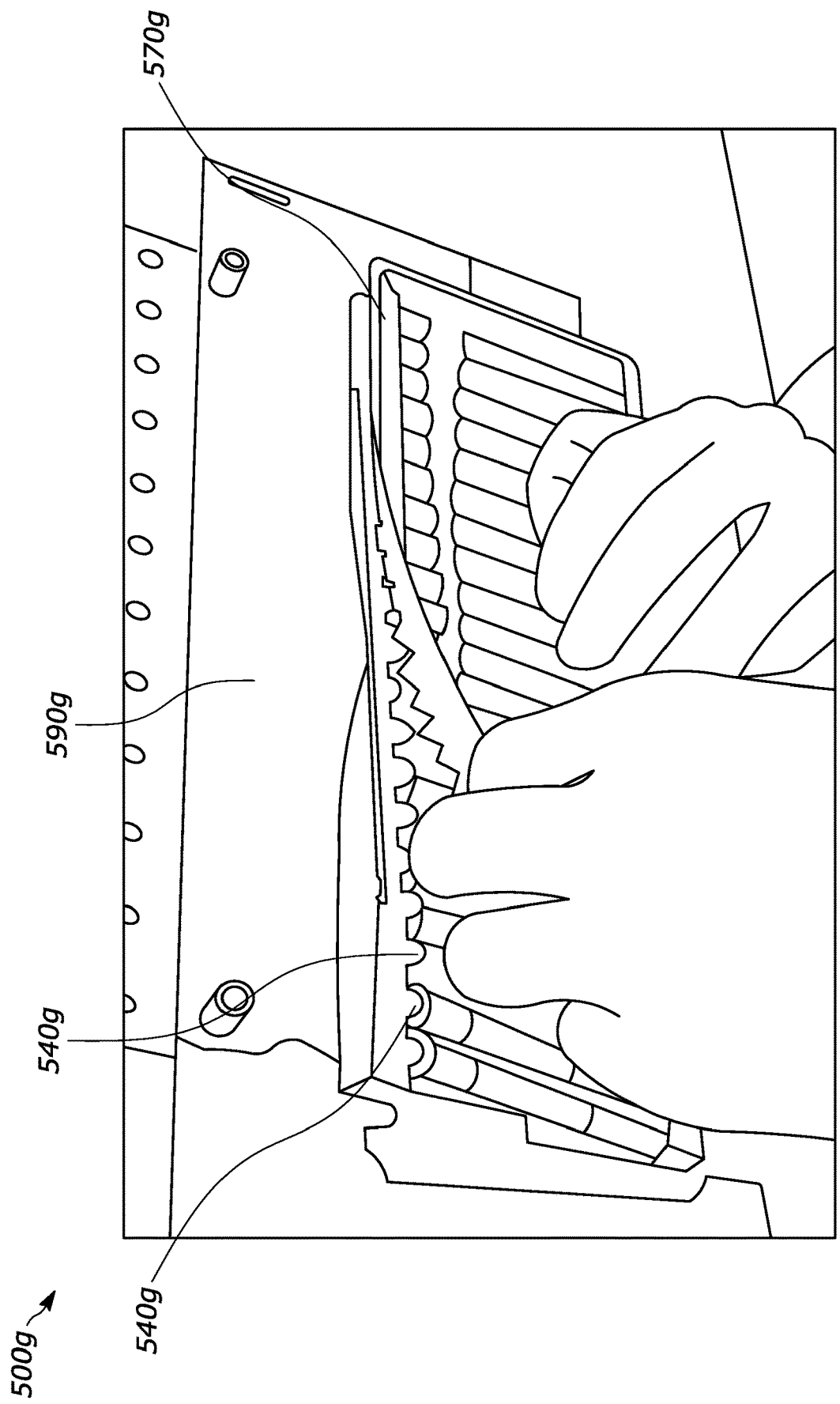
Figure 5H:
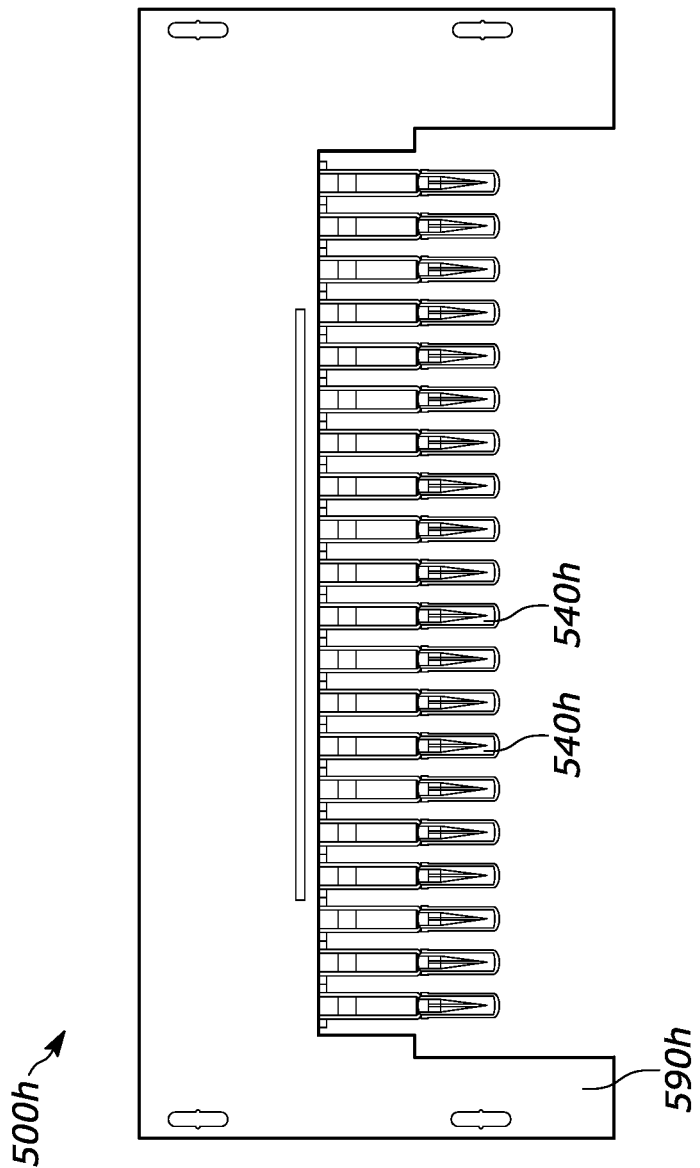
Figure 5J:
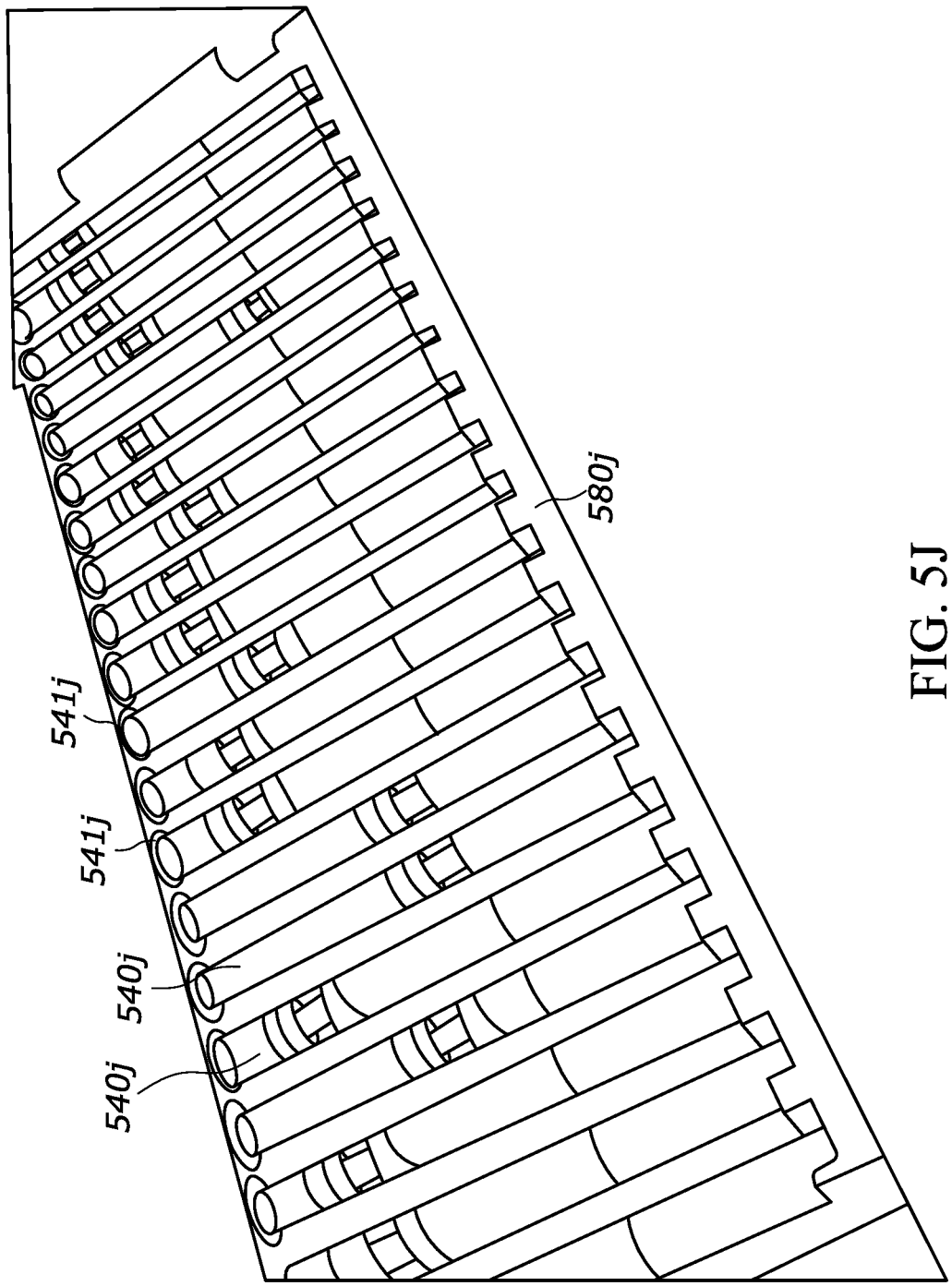
Figure 5K:
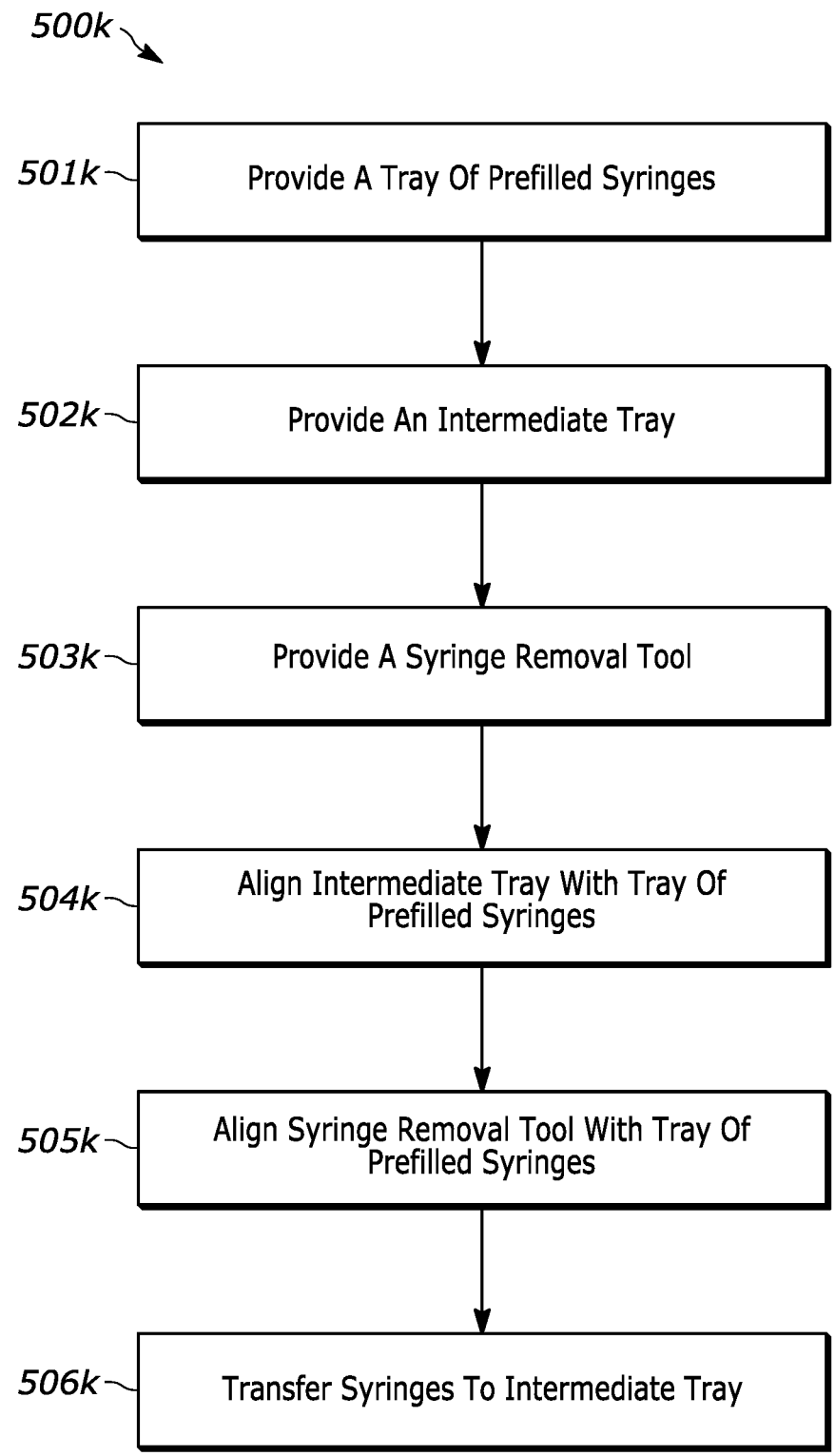

For clarity, only one digital image data acquisition device 405a,b,c is depicted in FIG. 4B. While FIG. 4B depicts only one digital image data acquisition device 405a,b,c, it should be understood that any number of digital image data acquisition device 405a,b,c may be supported and that each digital image data acquisition device 405a,b,c may be any appropriate digital image-based measurement device. A digital image data acquisition device 405a,b,c may include a memory 406b and a processor 408b for storing and executing, respectively, a module 407b. The module 407b, stored in the memory 406b as a set of computer-readable instructions, may be related to an application for automatically determining a plunger depth within at least one syringe based upon image data that is representative of a silhouette of at least a portion of a prefilled syringe.

As described in detail herein, the module 407b may facilitate interaction between an associated digital image data acquisition device 405a,b,c and a remote device 420b,e. For example, the processor 408b, further executing the module 407b, may facilitate communications between a remote device 420b,e and a digital image data acquisition device 405a,b,c via a digital image data acquisition device network interface 413b, a digital image data acquisition device communication link 431*b*, a network 430*b*, a remote device communication link 432*b*, and a remote device network interface 425*b*.

A digital image data acquisition device 405*a,b,c* may include a user interface 409*a,b* which may be any type of electronic display device, such as touch screen display, a liquid crystal display (LCD), a light emitting diode (LED) display, a plasma display, a cathode ray tube (CRT) display, or any other type of known or suitable electronic display along with a user input device. A user interface 409*a,b* may exhibit a user interface (e.g., any user interface 115, 129, 415*a*, etc.) which depicts a user interface for configuring a digital image data acquisition device 405*a,b,c* to communicate with a remote device 420*b,e*.

The network interface 413*b* may be configured to facilitate communications between a digital image data acquisition device 405*a,b,c* and a remote device 420*b,e* via any wireless communication network 430*b*, including for example a wireless LAN, MAN or WAN, WiFi, the Internet, or any combination thereof. Moreover, a digital image data acquisition device 405*a,b,c* may be communicatively connected to a remote device 420*b,e* via any suitable communication system, such as via any publicly available or privately owned communication network, including those that use wireless communication structures, such as wireless communication networks, including for example, wireless LANs and WANs, satellite and cellular telephone communication systems, etc. A digital image data acquisition device 405*a,b,c* may cause, for example, prefilled syringe inspection data and/or image data to be transmitted to, and stored in, for example, a remote device 420*b,e*, memory 421*b*, and/or a remote digital image-based measurement database 426*b*.

The digital image data acquisition device 405*a,b,c* may include a camera 410*b*, a backlight control 411*b*, and a stage control 412*b*. As described in detail herein, the digital image acquisition device 405*a,b,c* may be configured to, for example, cause the backlight 411*b* to emit light having a predetermined wavelength and/or intensity, and acquire image data from an image sensor 410*b* while at least a portion of a tubular vessel 140 and at least a portion of a plunger 150 are positioned between the image sensor 410*b* and the backlight 411*b* while the backlight 411*b* emits light.

A remote device 450*b,e* may include a user interface 424*b*, a memory 421*b,e*, and a processor 423*b* for storing and executing, respectively, a module 422*b*. The module 422*b*, stored in the memory 421*b* as a set of computer-readable instructions, may facilitate applications related to automatically determining a plunger depth within at least one prefilled syringe. The module 422*b* may also facilitate communications between the remote device 420*b,e* and a digital image data acquisition device 405*a,b,c* via a network interface 425*b*, and the network 430*b*, and other functions and instructions.

A remote device 420*b,e* may be communicatively coupled to a digital image-based measurement database 426*b*. While the digital image-based measurement database 426*b* is shown in FIG. 4B as being communicatively coupled to the remote device 420*b,e*, it should be understood that the digital image-based measurement database 426*b* may be located within separate remote servers (or any other suitable computing devices) communicatively coupled to the remote device 420*b,e*. Optionally, portions of digital image-based measurement database 426*b* may be associated with memory modules that are separate from one another, such as a memory 406*b,c* of a digital image data acquisition device 405*a,b,c*.

A digital image data acquisition device 405*a,b,c* may include a user interface generation module 407*c*, a prefilled syringe data receiving module 408*c*, a measurement device configuration data receiving module 409*c*, a camera control module 410*c*, a backlight control module 411*c*, a stage control module 412*c*, a printer control module 414*c*, an inspection data storage module 415*c*, and an inspection data transmission module 416*c*, for example, stored on a memory 406*c* as a set of computer-readable instructions. In any event, the modules 407*c*-416*c* may be similar to, for example, the module 407*b* of FIG. 4B.

A method of operating a digital image data acquisition device 405*a,b,c* may be implemented by a first processor (e.g., processor 408*b*) executing, for example, at least a portion of modules 407*c*-416*c*. In particular, processor 408*b* may execute the user interface generation module 407*c* to cause the processor 408*b* to, for example, generate a user interface 115, 129, 415*a*, 615 (block 407*d*). The user interface may allow a user to enter, for example, prefilled syringe data.

Processor 408*b* may execute the syringe data receiving module 408*c* to cause the processor 408*b* to, for example, receive prefilled syringe data from a prefilled syringe manufacture, a medicament manufacture, etc. (block 408*d*). Processor 408*b* may execute the measurement device configuration data receiving module 409*c* to cause the processor 408*b* to, for example, receive measurement device configuration data from a remote device (block 409*d*). Processor 408*b* may execute the camera control module 410*c* to cause the processor 408*b* to, for example, control a camera 110 (e.g., receive real-time image data) (block 410*d*). Processor 408*b* may execute the backlight control module 412*c* to cause the processor 408*b* to, for example, control a wavelength and/or intensity of light emitted from a backlight 111 (block 411*d*). Processor 408*b* may execute the stage control module 412*c* to cause the processor 408*b* to, for example, control the stage 112 (block 412*d*).

Processor 408*b* may execute the inspection data generation module 413*c* to cause the processor 408*b* to, for example, determine plunger location data and/or digital image data representative of a silhouette of at least a portion of a prefilled syringe (block 413*d*). Processor 408*b* may execute the printer control module 414*c* to cause the processor 408*b* to, for example, print prefilled syringe inspection data and/or image data (block 414*d*). Processor 408*b* may execute the inspection data storage module 415*c* to cause the processor 408*b* to, for example, store prefilled syringe inspection data and/or image data (block 415*d*). Processor 408*b* may execute the inspection data transmission module 416*c* to cause the processor 408*b* to, for example, transmit prefilled syringe inspection data and/or image data (block 416*d*).

A remote device 420*b,e* may include a user interface generation module 422*e*, a syringe data receiving module 423*e*, a measurement device data generation module 424*e*, a measurement device data transmission module 425*e*, an inspection data receiving module 426*e*, an inspection data analysis module 427*e*, and an inspection data storage module 428*e*, for example, stored on a memory 421*b,e* as a set of computer-readable instructions. In any event, the modules 422*e*-428*e* may be similar to, for example, the module 422*b* of FIG. 4B.

A method of operating a remote device 400*f* may be implemented by a processor (e.g., processor 423*b*) executing, for example, at least a portion of modules 422*e*-428*e*. In particular, processor 423*b* may execute the user interface generation module 422e to cause the processor 423b to, for example, generate a user interface 115, 129, 415a, 615, etc. (block 422f).

Processor 423b may execute the syringe data receiving module 423e to cause the processor 423b to, for example, receive prefilled syringe data from a user via a user interface and/or from a third-party prefilled syringe database (block 423f). Processor 423b may execute the measurement device data generation module 424e to cause the processor 423b to, for example, generate digital image data acquisition device configuration data (block 424f). The digital image data acquisition device configuration data may be representative of a backlight wavelength, a backlight intensity, an image sensor integration period, etc.

Processor 423b may execute the measurement device data transmission module 425e to cause the processor 423b to, for example, transmit digital image data acquisition device configuration data to digital image data acquisition device 405a-c (block 425f). Processor 423b may execute the inspection data receiving module 426e to cause the processor 423b to, for example, receive prefilled syringe inspection data and/or image data from a digital image data acquisition device 405a-c (block 426f). Processor 423b may execute the inspection data analysis module 427e to cause the processor 423b to, for example, analyze prefilled syringe inspection data and/or image data (block 427f). Processor 423b may execute the inspection data storage module 428e to cause the processor 423b to, for example, store prefilled syringe inspection data and/or image data (block 428f).

Turning to FIGS. 5A-H, J and K, a prefilled syringe inspection system 500a-h,j,k may include a tray of prefilled syringes 570a. The tray 570a of prefilled syringes 540a may be similar to for example the tray 170 of prefilled syringes 140 of FIG. 1. The tray 570a may include a plurality of prefilled syringe receptacles each having a distal end 571a, a proximal end 576a and prefilled syringe retainers 579a. Each prefilled syringe 540a may include a plunger 550a and a proximal end 541a. The proximal end 541a of each prefilled syringe 540a may be oriented in the proximal end 576a.

A tray 570a may be, for example, vacuum formed from opaque white plastic. The trays 570a may not block 100% of light. Instead, a tray 570a may tend to appear as a neutral density optical filter with filter material that is not homogeneously distributed. A higher intensity backlight may allow more light to pass through a tray, and may illuminate a plurality of PFSs through the tray. This effect may create a silhouette of the PFSs from which to measure plunger depth.

Prefilled syringe inspection is often times performed by technicians. Thus, use of intense lighting in a visible spectrum may not be desirable. Additionally, light that passes through a prefilled syringe (PFS) should not damage or generally disturb the active product contained therein. Therefore, a backlight wavelength may be in an infrared (IR) spectrum. IR is not visible to human operators and the wavelengths of IR are longer (lower energy) than visible wavelengths or UV wavelengths. Therefore, light in an IR spectrum is generally less likely to damage a medicament product. The "invisible" quality of a backlight to operators may both improve a working experience, and may offer an additional vision safety measure that isn't available on prior systems. 850 nm IR lighting was chosen due to its commercial availability and the ability of the Keyence to operate in this region.

Inspection of prefilled syringes in a tray 570a may include syringe distal flange edge and distal plunger edge detection, and plunger depth determination as, for example, described in U.S. Pat. No. 9,881,367 an out of tray method (e.g., prefilled syringe in intermediate holder 580j, prefilled syringe in gripper 600, etc.). Because optical artifacts 379, 579a in a tray 370, 570a may create false edges (e.g., edges of artifacts 379, 579a, etc.) when determining flange and stopper positions, edge detection boxes (or regions of interest (ROI) as described in U.S. Pat. No. 9,881,367, etc.), for a distal plunger edge and/or a distal syringe flange edge, may be incorporated. Any given region of interest may be, for example, based on a particular prefilled syringe to be inspected (e.g., a ROI may only be big enough to measure syringes within a product specified range, etc.). A tubular vessel inspection system may receive configuration data based on a product (e.g., tubular vessel, prefilled syringe, etc.) that may be representative of, for example, specific measurement parameters. Edge detection parameters and/or associated digital image processing filters may be incorporated within an associated tubular vessel inspection apparatus to, for example, cause the apparatus to disregard any edges of tray artifacts 379, 579a that may, otherwise, trigger false distal syringe flange edge and/or distal plunger edge detection. False distal syringe flange edge and/or distal plunger edge detection may result in erroneous plunger depth determination, tubular vessel inspection results, etc.

An intermediate holder 580b may include a plurality of V-block prefilled syringe receptacles 583b. A V-block 583b is a well-known mount for holding cylindrical objects, and may be self-centering in the V-block. A pitch 584b between adjacent V-blocks 583b may be that of corresponding tray receptacles to facilitate easy transfer and settling of syringes into the intermediate holder 580b. To allow for light transmission through the PFS when located in the V-block 583b, a strip 585b in a center of the V-block 583b directly below a respective PFS may be removed (i.e., optically unimpeded). The intermediate holder 580b may include outer tabs 582b that may align the sides and bottom of a tray to the intermediate holder, which ultimately aligns the V-block slots to the syringe receptacles of the tray and, therefore, to the PFSs.

An intermediate holder 580b may include, for example, twenty adjoining V-block style slots at a pitch of 14.9 mm—the same as a 1 ml PFS tray. Alignment tabs 582b on the side and bottom of the intermediate holder 580c may allow the tray 570c to fit inside the tabs 582b which may align the PFS in the tray to the corresponding slots in the intermediate holder. An intermediate holder 580b may include a plurality of needle cap receptacles 588b on a proximal end 581b, a plurality of prefilled syringe alignment features 587b, and a distal end 586b. When the prefilled syringes 540j are received within a respective V-block 583b, a respective alignment feature 587b is positioned between a proximal end 244 of a prefilled syringe 540j and a distal end of a needle cap 256.

A tray 570c of prefilled syringes 540c may be aligned with an intermediate holder 580c with the V-blocks 583c aligned with a respective prefilled syringe 540c as viewed from a proximal end 576c. The aligned tray 570c and intermediate holder 570c may be flipped over with a proximal end 570d of the tray 570d oriented opposite the proximal end 570c, and with the bottom side of the prefilled syringe receptacles 579c oriented upward.

A prefilled syringe removal tool 590e-h may include a plurality of stubby "fingers" 591e located at the center axis of the respective PFSs 540f-h is then used to dislodge the PFSs one at a time, but in quick succession, so that the PFS may pop out of the tray receptacles and drop into their corresponding V-block in the intermediate holder. The "fingers", whose length may be, for example, only a few millimeters, may be aligned and inserted into the respective PFS syringe tube during the alignment process. When the tray is lifted, the fingers may apply a downward pressure on the PFS, and may cause the PFS to dislodge from its tray receptacle. A tray 570g may be lifted asymmetrically from one side to another in order to allow the prefilled syringes 540g to pop out of the tray one at a time.

A method of transferring the prefilled syringes from a tray to an intermediate holder 500k may include providing a tray of prefilled syringes (block 501k), an intermediate holder (block 502k), a syringe removal tool (block 503k), and a syringe return tool (block 504k). The method 500k may also include aligning the intermediate holder with the tray of prefilled syringes (block 505k), aligning the syringe removal tool with the tray of prefilled syringes (block 506k), and transferring the prefilled syringes from the tray to the intermediate holder (block 507k). Subsequent to inspection, a plurality of syringes may be returned to a tray 170 from an intermediate holder 180 using, for example, a syringe return tool 600a-d (block 508k).

The principle behind the fast transfer method is to quickly move the syringes form a tray into an intermediate holder that is better suited for measurement on the imaging system. There are several criteria that the intermediate holder must meet, which ultimately govern its design, The prefilled syringes may transfer quickly and easily from a tray to an intermediate holder without damage. The syringe barrels may be optically unimpeded from lighting and imaging The syringe removal tool 590e may include alignment slots 593e on the left and right where the combined tray/intermediate holder 570c, 580c may be place, and the points or "fingers" 591e may be slowly inserted into a distal end 242 of the respective syringe barrel 245. The syringes 540g, 540h may be transferred by lifting the tray 570g from one corner and pulling towards an opposite corner. This asymmetric lifting motion may allow the prefilled syringes to pop out of the tray 570g one at a time where the prefilled syringes 540j then settle in a corresponding V-block 583b,c in the intermediate holder 580j.

Once the prefilled syringes 540j are transferred to the intermediate holder 580j, the flanges 541j may extend beyond a distal end 586b of the intermediate holder 580j. When the intermediate holder 580j with prefilled syringes 540j is place between an images sensor 110 and a backlight 111, at least a portion of the flanges 541j and at least a portion of the plunger 550a are optically unimpeded by the intermediate holder 580j. Therefore, an intensity of the backlight 111 may be lower than when the prefilled syringes 540a are in a tray 570a, and artifacts within associated image data may be reduced.

Measurement of the prefilled syringes following transfer to the intermediate holder is straightforward. Briefly, the vision engine identifies an obvious reference in the image. From that reference, measurement boxes for the PFS flange and stopper are drawn. The measurement boxes are designed to identify the topmost part of the flange and the topmost part of the stopper. The distance between those two points is calculated on the axis of the PFS barrel, i.e. along the barrel axis.

Figure 6A:
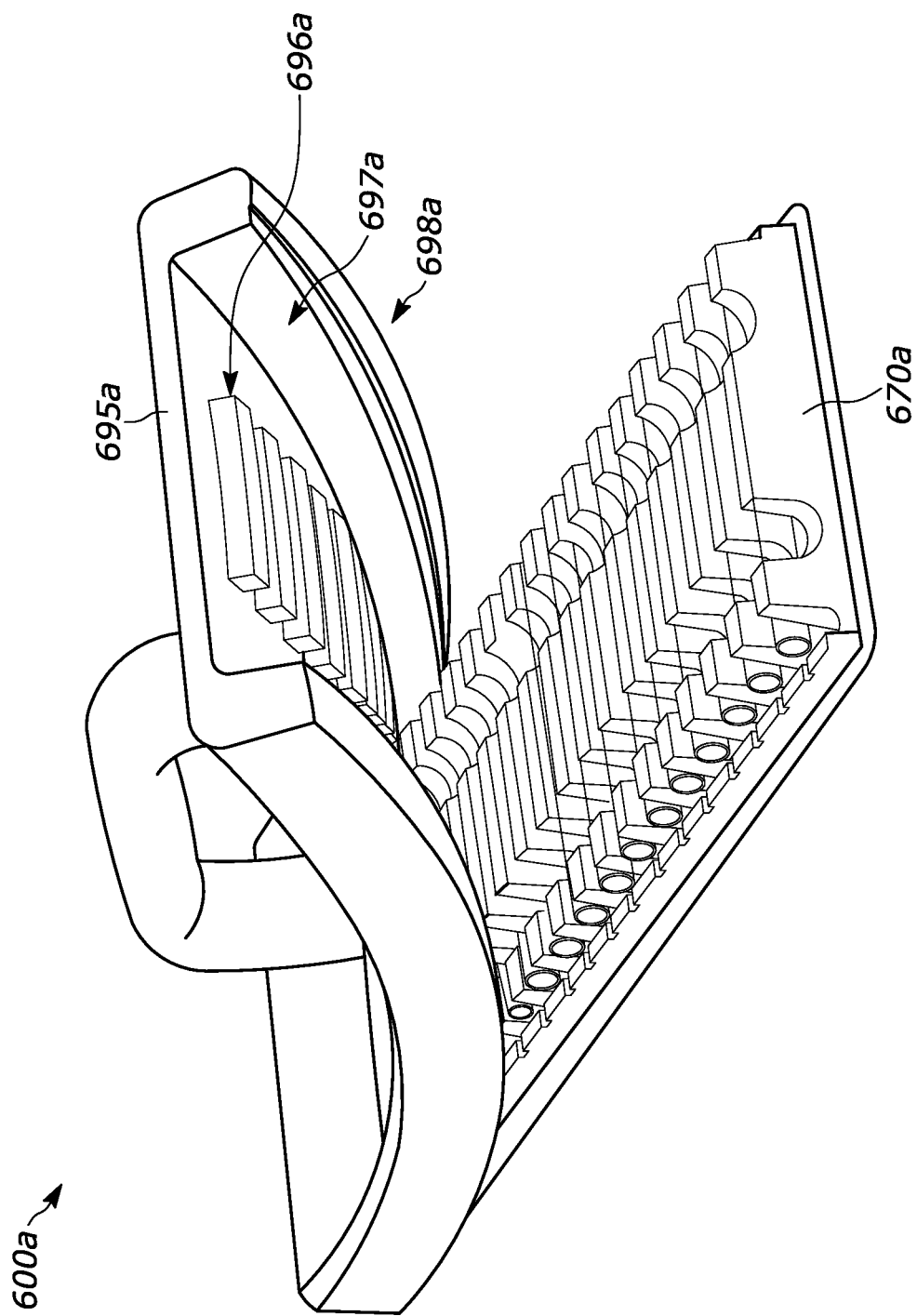
FIGS. 6A-D depict an example syringe return tool.
Figure 6B:
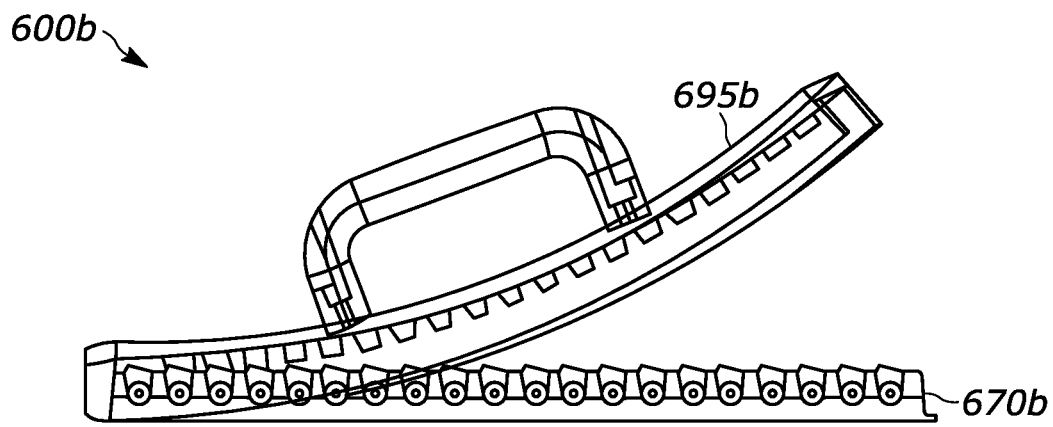
Figure 6C:
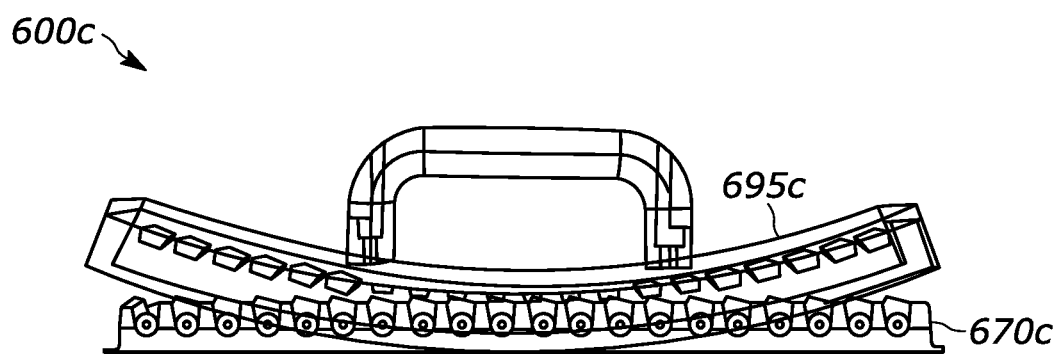
Figure 6D:
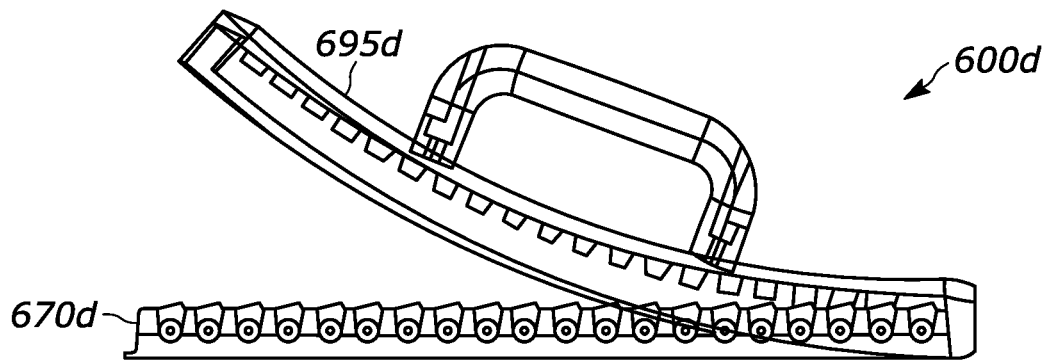

With reference to FIGS. 6A-D, a prefilled syringe inspection system 600a-d may include a syringe return tool 695a-d. The syringe return tool 695a-d may include pads 696a (e.g., rubber pad, soft material, etc.) configured to, for example, form contact points to press syringes into the tray 670a. The syringe return tool 695a-d may also include beveled interior surfaces 697a which may be, for example, matched to a tray 670a design to ensure continuous alignment. The syringe return tool 695a-d may further include an arced shape 698a based on, for example, a tray 670a. The arced shape 698a may, for example, allow ergonomic and efficient hand, wrist, and arm movement while an operator reorients the syringe return tool 695b-d as illustrated in FIGS. 6B-D. An operator may roll a syringe return tool 695a-d across a tray 670a-d, thereby pressing the syringes safely into place, in sequence, in a single motion.

In order to, for example, integrate a tubular vessel inspection with an associated manufacturing process, syringes may be returned to a tray 670a-d after inspection of the tubular vessels while the tubular vessels are within an intermediate holder. A syringe return tool 695a-d may mitigate risk to an associated product, safety risk to an operator, etc. The syringe return tool 695a-d may also serve to increase efficiency of a syringe return portion of an inspection process.

Figure 7:
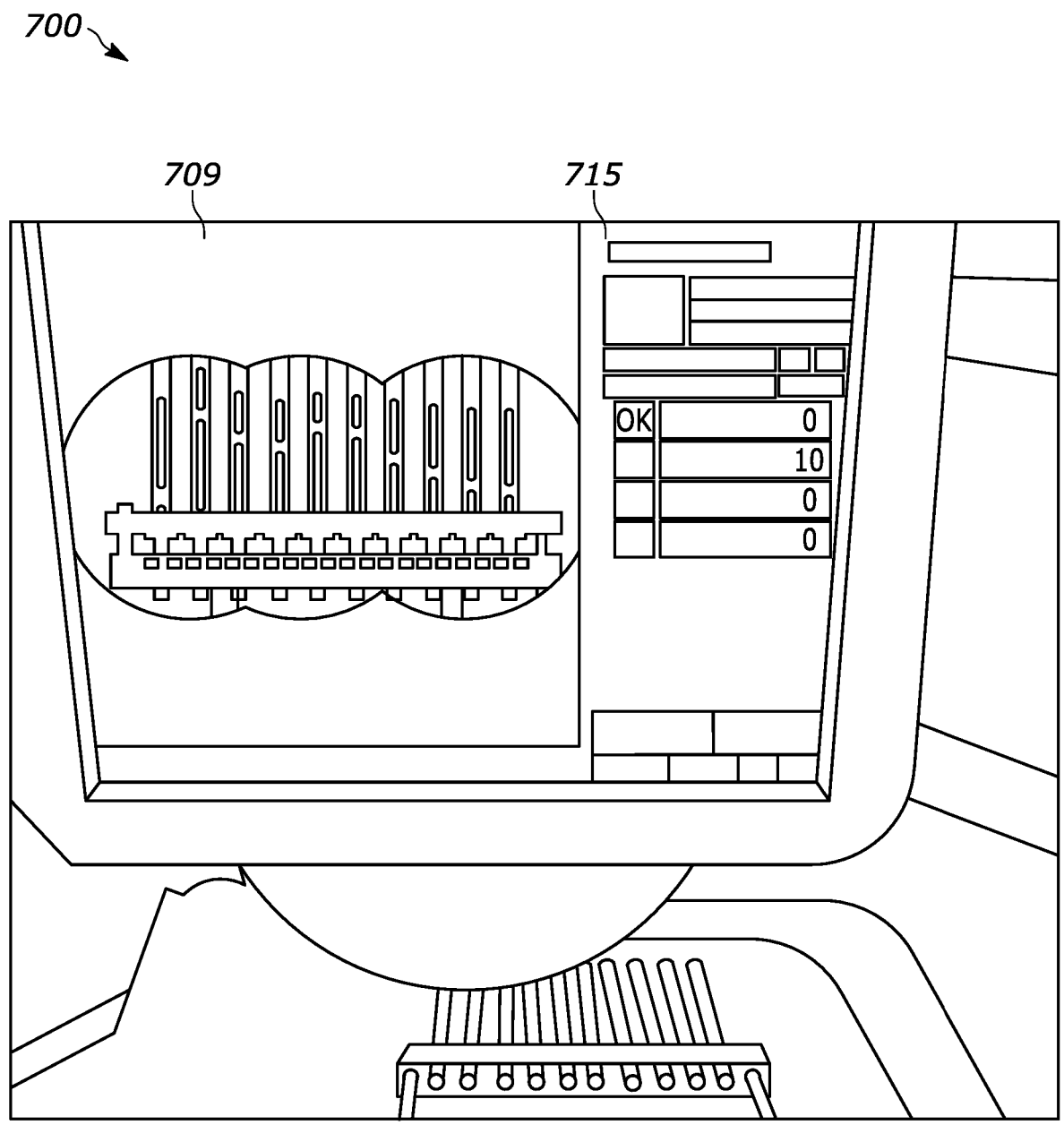
FIG. 7 depicts an example silhouette display of a plurality of prefilled syringes secured within a gripper.

Turning to FIG. 7, a prefilled syringe inspection system 700 may include a user interface 709 with a silhouette display 715 of a plurality of prefilled syringes secured within a gripper. As can be seen, light from a backlight is optically unimpeded to the prefilled syringes and light through the PFSs is optically unimpeded from the prefilled syringes to an image sensor.

Figure 8:
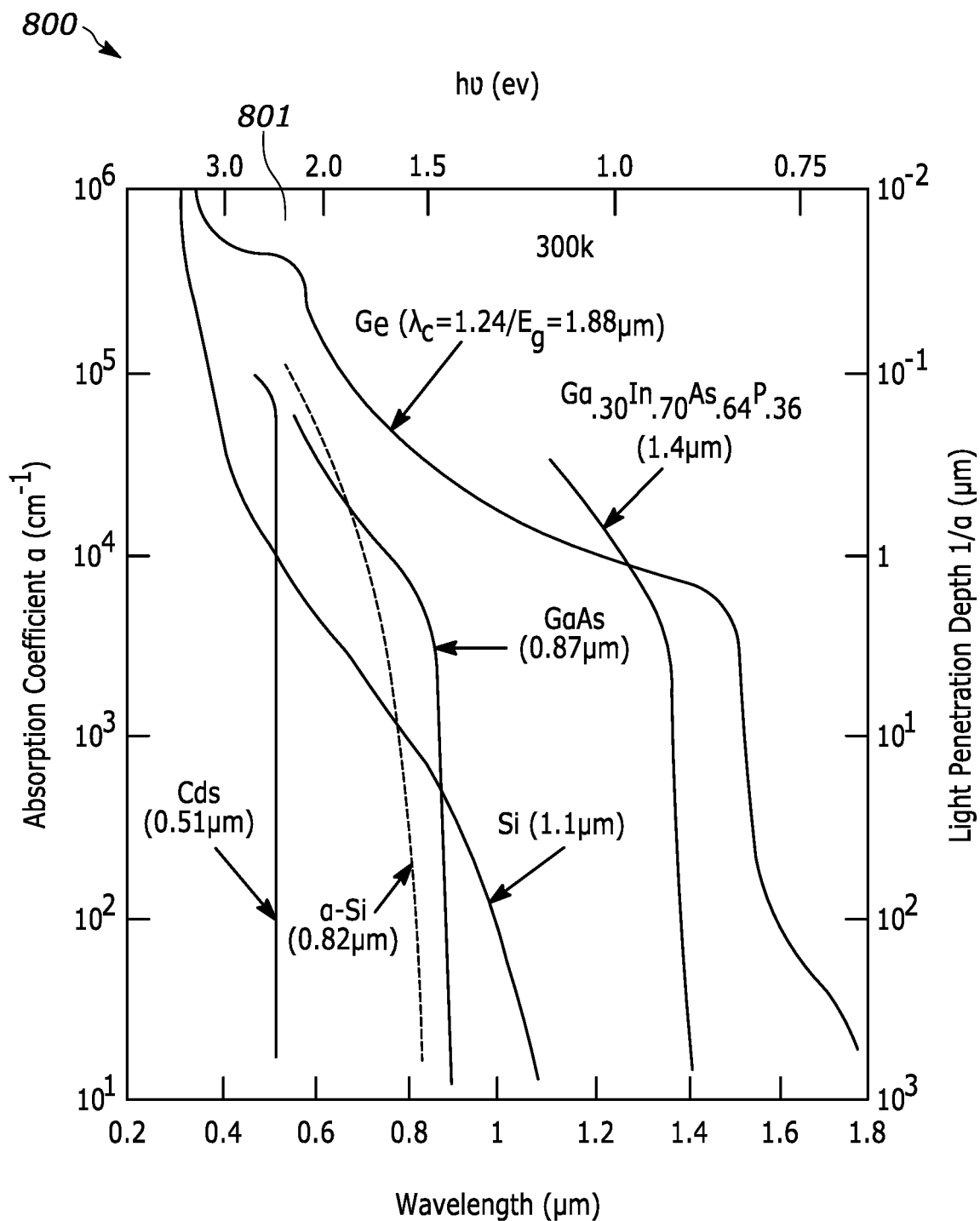
FIG. 8 depicts a graph of example light sensor absorption and penetration.

With reference to FIG. 8, a tubular vessel inspection system 800 may include an image sensor 110 having light sensor absorption and penetration graph 801. A backlight 111 may emit light having a wavelength that is ~850 nm. The backlight 111 may include individual LED light sources that are 82 W and uniformly distributed. The backlight 111 may be pulse width modulated PWM at 35% duty cycle. The LEDs may be ~70% efficient, thus, may impart ~20W unadulterated light during normal operation (e.g., 380 W/m^2 for a 150 mm×350 mm light, etc.). Correspondingly, an exposure of image sensor 110 may be, for example, twelve seconds. A tubular vessel inspection system may include a balance between image sensor 110 exposure time and a backlight 111 intensity setting.

Figure 9:
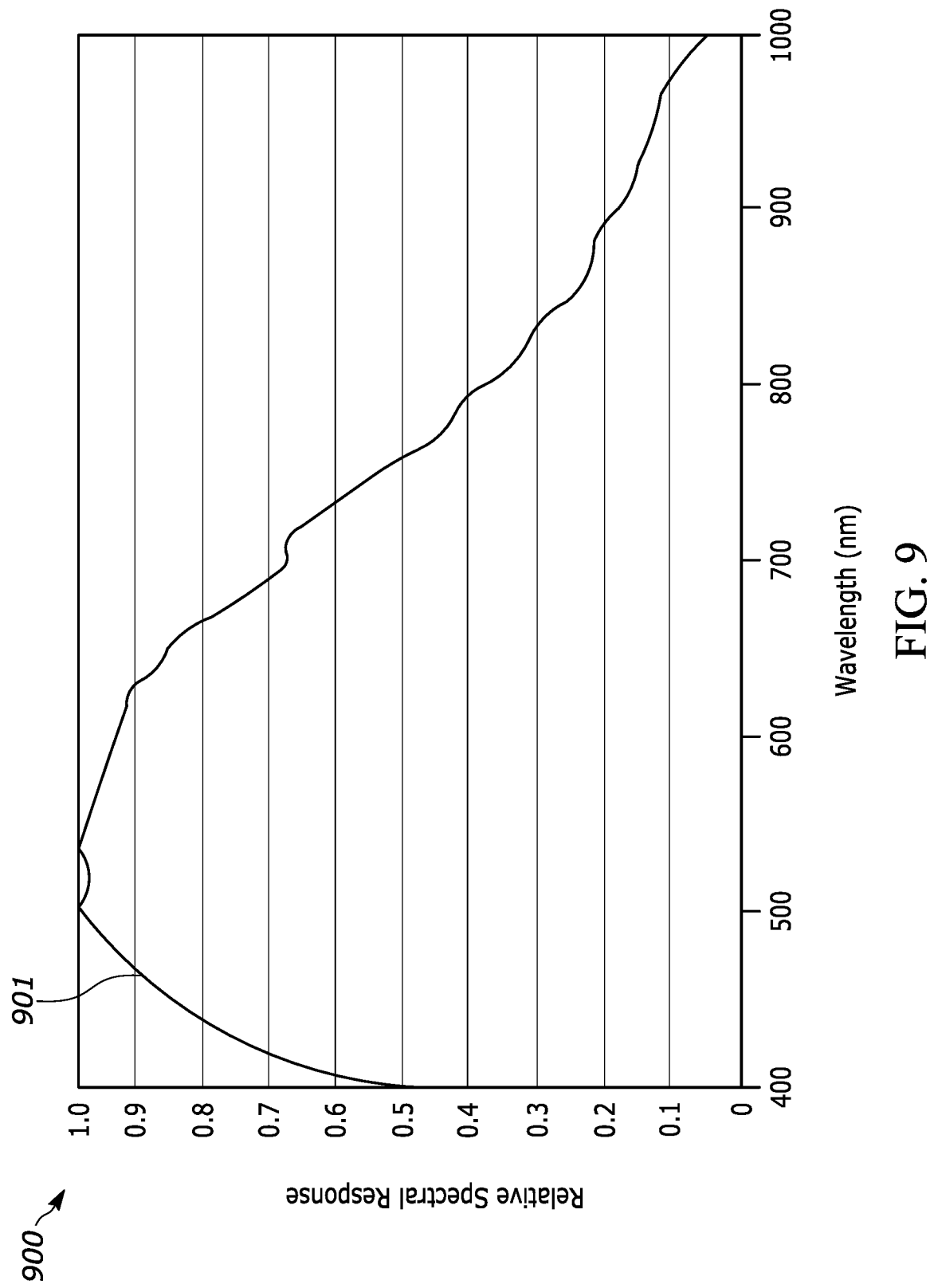
FIG. 9 depicts a graph of an example light sensor normalized spectral response.

Turning to FIG. 9, a tubular vessel inspection system 900 may include an image sensor 110 having light sensor normalized spectral response 901. Backlight 111 intensity may be minimized while still achieving good imaging under modest exposure (e.g., as illustrated in FIG. 3, etc.). The intensity and exposure number can be adjusted to ranges according to, for example, a linear relationship between intensity and exposure time.

Backlight 111 may, for example, emit light having a wavelength of 400-700 nm. Alternatively, a backlight 111 may emit light having a wavelength in a near infrared spectrum of 700-800 nm. As another alternative, a backlight 111 may emit light having a wavelength within an infrared spectrum of 800-~1 um. In certain applications, a backlight 111 may be configured to emit light having a wavelength of 1.6 um using, for example, an InGaAs detector. A backlight 111 may include light sources having lower power (e.g., as low as 15 W at max power based upon illumination area needed to make this measurement, etc.).

Duty cycle for backlight 111 illumination sources and exposure for an image sensor 110 may be, for example, inversely-proportional. Short light exposure (e.g., a few ms, etc.) may, for example, benefit from higher light intensity to avoid shot noise. Conversely, exposure may be reduced and reduce the light intensity. An overall relationship between image sensor 110 exposure and backlight 111 intensity may be, for example, based upon total light (i.e., time*photon flux=total light per area per image=constant). Example exposure ranges may include a few ms up to about 20 ms. Longer exposure times, at the 20-60% PWM duty cycles, may result in over exposure.

The above description describes various devices, assemblies, components, subsystems and methods for use related to a drug delivery device such as a pre-filled syringe. The devices, assemblies, components, subsystems, methods or drug delivery devices (i.e., prefilled syringe) can further comprise or be used with a drug including but not limited to those drugs identified below as well as their generic and biosimilar counterparts. The term drug, as used herein, can be used interchangeably with other similar terms and can be used to refer to any type of medicament or therapeutic material including traditional and non-traditional pharmaceuticals, nutraceuticals, supplements, biologics, biologically active agents and compositions, large molecules, biosimilars, bioequivalents, therapeutic antibodies, polypeptides, proteins, small molecules and generics. Non-therapeutic injectable materials are also encompassed. The drug may be in liquid form, a lyophilized form, or in a reconstituted from lyophilized form. The following example list of drugs should not be considered as all-inclusive or limiting.

The drug will be contained in a reservoir within the pre-filled syringe for example. In some instances, the reservoir is a primary container that is either filled or pre-filled for treatment with the drug. The primary container can be a vial, a cartridge or a pre-filled syringe.

In some embodiments, the reservoir of the drug delivery device may be filled with or the device can be used with colony stimulating factors, such as granulocyte colony-stimulating factor (G-CSF). Such G-CSF agents include but are not limited to Neulasta® (pegfilgrastim, pegylated filgastrim, pegylated G-CSF, pegylated hu-Met-G-CSF) and Neupogen® (filgrastim, G-CSF, hu-MetG-CSF), UDENYCA® (pegfilgrastim-cbqv), Ziextenzo® (LA-EP2006; pegfilgrastim-bmez), or FULPHILA (pegfilgrastim-bmez).

In other embodiments, the drug delivery device may contain or be used with an erythropoiesis stimulating agent (ESA), which may be in liquid or lyophilized form. An ESA is any molecule that stimulates erythropoiesis. In some embodiments, an ESA is an erythropoiesis stimulating protein. As used herein, "erythropoiesis stimulating protein" means any protein that directly or indirectly causes activation of the erythropoietin receptor, for example, by binding to and causing dimerization of the receptor. Erythropoiesis stimulating proteins include erythropoietin and variants, analogs, or derivatives thereof that bind to and activate erythropoietin receptor; antibodies that bind to erythropoietin receptor and activate the receptor; or peptides that bind to and activate erythropoietin receptor. Erythropoiesis stimulating proteins include, but are not limited to, Epogen® (epoetin alfa), Aranesp® (darbepoetin alfa), Dynepo® (epoetin delta), Mircera® (methoxy polyethylene glycol-epoetin beta), Hematide®, MRK-2578, INS-22, Retacrit® (epoetin zeta), Neorecormon® (epoetin beta), Silapo® (epoetin zeta), Binocrit® (epoetin alfa), epoetin alfa Hexal, Abseamed® (epoetin alfa), Ratioepo® (epoetin theta), Eporatio® (epoetin theta), Biopoin® (epoetin theta), epoetin alfa, epoetin beta, epoetin iota, epoetin omega, epoetin delta, epoetin zeta, epoetin theta, and epoetin delta, pegylated erythropoietin, carbamylated erythropoietin, as well as the molecules or variants or analogs thereof.

Among particular illustrative proteins are the specific proteins set forth below, including fusions, fragments, analogs, variants or derivatives thereof: OPGL specific antibodies, peptibodies, related proteins, and the like (also referred to as RANKL specific antibodies, peptibodies and the like), including fully humanized and human OPGL specific antibodies, particularly fully humanized monoclonal antibodies; Myostatin binding proteins, peptibodies, related proteins, and the like, including myostatin specific peptibodies; IL-4 receptor specific antibodies, peptibodies, related proteins, and the like, particularly those that inhibit activities mediated by binding of IL-4 and/or IL-13 to the receptor; Interleukin 1-receptor 1 ("IL1-R1") specific antibodies, peptibodies, related proteins, and the like; Ang2 specific antibodies, peptibodies, related proteins, and the like; NGF specific antibodies, peptibodies, related proteins, and the like; CD22 specific antibodies, peptibodies, related proteins, and the like, particularly human CD22 specific antibodies, such as but not limited to humanized and fully human antibodies, including but not limited to humanized and fully human monoclonal antibodies, particularly including but not limited to human CD22 specific IgG antibodies, such as, a dimer of a human-mouse monoclonal hLL2 gamma-chain disulfide linked to a human-mouse monoclonal hLL2 kappa-chain, for example, the human CD22 specific fully humanized antibody in Epratuzumab, CAS registry number 501423-23-0; IGF-1 receptor specific antibodies, peptibodies, and related proteins, and the like including but not limited to anti-IGF-1R antibodies; B-7 related protein 1 specific antibodies, peptibodies, related proteins and the like ("B7RP-1" and also referring to B7H2, ICOSL, B7h, and CD275), including but not limited to B7RP-specific fully human monoclonal IgG2 antibodies, including but not limited to fully human IgG2 monoclonal antibody that binds an epitope in the first immunoglobulin-like domain of B7RP-1, including but not limited to those that inhibit the interaction of B7RP-1 with its natural receptor, ICOS, on activated T cells; IL-15 specific antibodies, peptibodies, related proteins, and the like, such as, in particular, humanized monoclonal antibodies, including but not limited to HuMax IL-15 antibodies and related proteins, such as, for instance, 145c7; IFN gamma specific antibodies, peptibodies, related proteins and the like, including but not limited to human IFN gamma specific antibodies, and including but not limited to fully human anti-IFN gamma antibodies; TALL-1 specific antibodies, peptibodies, related proteins, and the like, and other TALL specific binding proteins; Parathyroid hormone ("PTH") specific antibodies, peptibodies, related proteins, and the like; Thrombopoietin receptor ("TPO-R") specific antibodies, peptibodies, related proteins, and the like; Hepatocyte growth factor ("HGF") specific antibodies, peptibodies, related proteins, and the like, including those that target the HGF/SF:cMet axis (HGF/SF:c-Met), such as fully human monoclonal antibodies that neutralize hepatocyte growth factor/scatter (HGF/SF); TRAIL-R2 specific antibodies, peptibodies, related proteins and the like; Activin A specific antibodies, peptibodies, proteins, and the like; TGF-beta specific antibodies, peptibodies, related proteins, and the like; Amyloid-beta protein specific antibodies, peptibodies, related proteins, and the like; c-Kit specific antibodies, peptibodies, related proteins, and the like, including but not limited to proteins that bind c-Kit and/or other stem cell factor receptors; OX40L specific antibodies, peptibodies, related proteins, and the like, including but not limited to proteins that bind OX40L and/or other ligands of the OX40 receptor; Activase® (alteplase, tPA); Aranesp® (darbepoetin alfa) Erythropoietin [30-asparagine, 32-threonine, 87-valine, 88-asparagine, 90-threonine], Darbepoetin alfa, novel erythropoiesis stimulating protein (NESP); Epogen® (epoetin alfa, or erythropoietin); GLP-1, Avonex® (interferon beta-1a); Bexxar® (tositumomab, anti-CD22 monoclonal antibody); Betaseron® (interferon-beta); Campath® (alemtuzumab, anti-CD52 monoclonal antibody); Dynepo® (epoetin delta); Velcade® (bortezomib); MLN0002 (anti-α4β7 mAb); MLN1202 (anti-CCR2 chemokine receptor mAb); Enbrel® (etanercept, TNF-receptor/Fc fusion protein, TNF blocker); Eprex® (epoetin alfa); Erbitux® (cetuximab, anti-EGFR/HER1/c-ErbB-1); Genotropin® (somatropin, Human Growth Hormone); Herceptin® (trastuzumab, anti-HER2/neu (erbB2) receptor mAb); Kanjinti™ (trastuzumab-anns) anti-HER2 monoclonal antibody, biosimilar to Herceptin®, or another product containing trastuzumab for the treatment of breast or gastric cancers; Humatrope® (somatropin, Human Growth Hormone); Humira® (adalimumab); Vectibix® (panitumumab), Xgeva® (denosumab), Prolia® (denosumab), Immunoglobulin G2 Human Monoclonal Antibody to RANK Ligand, Enbrel® (etanercept, TNF-receptor/Fc fusion protein, TNF blocker), Nplate® (romiplostim), rilotumumab, ganitumab, conatumumab, brodalumab, insulin in solution; Infergen® (interferon alfacon-1); Natrecor® (nesiritide; recombinant human B-type natriuretic peptide (hBNP); Kineret® (anakinra); Leukine® (sargamostim, rhuGM-CSF); LymphoCide® (epratuzumab, anti-CD22 mAb); Benlysta™ (lymphostat B, belimumab, anti-BlyS mAb); Metalyse® (tenecteplase, t-PA analog); Mircera® (methoxy polyethylene glycol-epoetin beta); Mylotarg® (gemtuzumab ozogamicin); Raptiva® (efalizumab); Cimzia® (certolizumab pegol, CDP 870); Soliris™ (eculizumab); pexelizumab (anti-C5 complement); Numax® (MEDI-524); Lucentis® (ranibizumab); Panorex® (17-1A, edrecolomab); Trabio® (lerdelimumab); TheraCim hR3 (nimotuzumab); Omnitarg (pertuzumab, 2C4); Osidem® (IDM-1); OvaRex® (B43.13); Nuvion® (visilizumab); cantuzumab mertansine (huC242-DM1); NeoRecormon® (epoetin beta); Neumega® (oprelvekin, human interleukin-11); Orthoclone OKT3® (muromonab-CD3, anti-CD3 monoclonal antibody); Procrit® (epoetin alfa); Remicade® (infliximab, anti-TNFα monoclonal antibody); Reopro® (abciximab, anti-GP IIb/IIIa receptor monoclonal antibody); Actemra® (anti-IL6 Receptor mAb); Avastin® (bevacizumab), HuMax-CD4 (zanolimumab); Mvasi™ (bevacizumab-awwb); Rituxan® (rituximab, anti-CD20 mAb); Tarceva® (erlotinib); Roferon-A®-(interferon alfa-2a); Simulect® (basiliximab); Prexige® (lumiracoxib); Synagis® (palivizumab); 145c7-CHO (anti-IL15 antibody, see U.S. Pat. No. 7,153,507); Tysabri® (natalizumab, anti-α4integrin mAb); Valortim® (MDX-1303, anti-*B. anthracis* protective antigen mAb); ABthrax™; Xolair® (omalizumab); ETI211 (anti-MRSA mAb); IL-1 trap (the Fc portion of human IgG1 and the extracellular domains of both IL-1 receptor components (the Type I receptor and receptor accessory protein)); VEGF trap (Ig domains of VEGFR1 fused to IgG1 Fc); Zenapax® (daclizumab); Zenapax® (daclizumab, anti-IL-2Ra mAb); Zevalin® (ibritumomab tiuxetan); Zetia® (ezetimibe); Orencia® (atacicept, TACI-Ig); anti-CD80 monoclonal antibody (galiximab); anti-CD23 mAb (lumiliximab); BR2-Fc (huBR3/huFc fusion protein, soluble BAFF antagonist); CNTO 148 (golimumab, anti-TNFα mAb); HGS-ETR1 (mapatumumab; human anti-TRAIL Receptor-1 mAb); HuMax-CD20 (ocrelizumab, anti-CD20 human mAb); HuMax-EGFR (zalutumumab); M200 (volociximab, anti-α5β1 integrin mAb); MDX-010 (ipilimumab, anti-CTLA-4 mAb and VEGFR-1 (IMC-18F1); anti-BR3 mAb; anti-*C. difficile* Toxin A and Toxin B C mAbs MDX-066 (CDA-1) and MDX-1388); anti-CD22 dsFv-PE38 conjugates (CAT-3888 and CAT-8015); anti-CD25 mAb (HuMax-TAC); anti-CD3 mAb (NI-0401); adecatumumab; anti-CD30 mAb (MDX-060); MDX-1333 (anti-IFNAR); anti-CD38 mAb (HuMax CD38); anti-CD40L mAb; anti-Cripto mAb; anti-CTGF Idiopathic Pulmonary Fibrosis Phase I Fibrogen (FG-3019); anti-CTLA4 mAb; anti-eotaxin1 mAb (CAT-213); anti-FGF8 mAb; anti-ganglioside GD2 mAb; anti-ganglioside GM2 mAb; anti-GDF-8 human mAb (MYO-029); anti-GM-CSF Receptor mAb (CAM-3001); anti-HepC mAb (HuMax HepC); anti-IFNβ mAb (MEDI-545, MDX-198); anti-IGF1R mAb; anti-IGF-1R mAb (HuMax-Inflam); anti-IL12 mAb (ABT-874); anti-IL12/IL23 mAb (CNTO 1275); anti-IL13 mAb (CAT-354); anti-IL2Ra mAb (HuMax-TAC); anti-IL5 Receptor mAb; anti-integrin receptors mAb (MDX-018, CNTO 95); anti-IP10 Ulcerative Colitis mAb (MDX-1100); BMS-66513; anti-Mannose Receptor/hCGβ mAb (MDX-1307); anti-mesothelin dsFv-PE38 conjugate (CAT-5001); anti-PD1mAb (MDX-1106 (ONO-4538)); anti-PDGFRα antibody (IMC-3G3); anti-TGFβ mAb (GC-1008); anti-TRAIL Receptor-2 human mAb (HGS-ETR2); anti-TWEAK mAb; anti-VEGFR/Flt-1 mAb; and anti-ZP3 mAb (HuMax-ZP3).

In some embodiments, the drug delivery device may contain or be used with a sclerostin antibody, such as but not limited to romosozumab, blosozumab, BPS 804 (Novartis), Evenity™ (romosozumab-aqqg), another product containing romosozumab for treatment of postmenopausal osteoporosis and/or fracture healing and in other embodiments, a monoclonal antibody (IgG) that binds human Proprotein Convertase Subtilisin/Kexin Type 9 (PCSK9). Such PCSK9 specific antibodies include, but are not limited to, Repatha® (evolocumab) and Praluent® (alirocumab). In other embodiments, the drug delivery device may contain or be used with rilotumumab, bixalomer, trebananib, ganitumab, conatumumab, motesanib diphosphate, brodalumab, vidupiprant or panitumumab. In some embodiments, the reservoir of the drug delivery device may be filled with or the device can be used with IMLYGIC® (talimogene laherparepvec) or another oncolytic HSV for the treatment of melanoma or other cancers including but are not limited to OncoVEXGALV/CD; OrienX010; G207, 1716; NV1020; NV12023; NV1034; and NV1042. In some embodiments, the drug delivery device may contain or be used with endogenous tissue inhibitors of metalloproteinases (TIMPs) such as but not limited to TIMP-3. In some embodiments, the drug delivery device may contain or be used with Aimovig® (erenumab-aooe), anti-human CGRP-R (calcitonin gene-related peptide type 1 receptor) or another product containing erenumab for the treatment of migraine headaches. Antagonistic antibodies for human calcitonin gene-related peptide (CGRP) receptor such as but not limited to erenumab and bispecific antibody molecules that target the CGRP receptor and other headache targets may also be delivered with a drug delivery device of the present disclosure. Additionally, bispecific T cell engager (BiTE®) antibodies such as but not limited to BLINCYTO® (blinatumomab) can be used in or with the drug delivery device of the present disclosure. In some embodiments, the drug delivery device may contain or be used with an APJ large molecule agonist such as but not limited to apelin or analogues thereof. In some embodiments, a therapeutically effective amount of an anti-thymic stromal lymphopoietin (TSLP) or TSLP receptor antibody is used in or with the drug delivery device of the present disclosure. In some embodiments, the drug delivery device may contain or be used with Avsola™ (infliximab-axxq), anti-TNF α monoclonal antibody, biosimilar to Remicade® (infliximab) (Janssen Biotech, Inc.) or another product containing infliximab for the treatment of autoimmune diseases. In some embodiments, the drug delivery device may contain or be used with Kyprolis® (carfilzomib), (2S)-N-((S)-1-((S)-4-methyl-1-((R)-2-methyloxiran-2-yl)-1-oxopentan-2-ylcarbamoyl)-2-phenylethyl)-2-((S)-2-(2-morpholinoacetamido)-4-phenylbutanamido)-4-methylpentanamide, or another product containing carfilzomib for the treatment of multiple myeloma. In some embodiments, the drug delivery device may contain or be used with Otezla® (apremilast), N-[2-[(1S)-1-(3-ethoxy-4-methoxyphenyl)-2-(methylsulfonyl)ethyl]-2,3-dihydro-1,3-dioxo-1H-isoindol-4-yl]acetamide, or another product containing apremilast for the treatment of various inflammatory diseases. In some embodiments, the drug delivery device may contain or be used with Parsabiv™ (etelcalcetide HCl, KAI-4169) or another product containing etelcalcetide HCl for the treatment of secondary hyperparathyroidism (sHPT) such as in patients with chronic kidney disease (KD) on hemodialysis. In some embodiments, the drug delivery device may contain or be used with ABP 798 (rituximab), a biosimilar candidate to Rituxan®/MabThera™, or another product containing an anti-CD20 monoclonal antibody. In some embodiments, the drug delivery device may contain or be used with a VEGF antagonist such as a non-antibody VEGF antagonist and/or a VEGF-Trap such as aflibercept (Ig domain 2 from VEGFR1 and Ig domain 3 from VEGFR2, fused to Fc domain of IgG1). In some embodiments, the drug delivery device may contain or be used with ABP 959 (eculizumab), a biosimilar candidate to Soliris®, or another product containing a monoclonal antibody that specifically binds to the complement protein C5. In some embodiments, the drug delivery device may contain or be used with Rozibafusp alfa (formerly AMG 570) is a novel bispecific antibody-peptide conjugate that simultaneously blocks ICOSL and BAFF activity. In some embodiments, the drug delivery device may contain or be used with Omecamtiv mecarbil, a small molecule selective cardiac myosin activator, or myotrope, which directly targets the contractile mechanisms of the heart, or another product containing a small molecule selective cardiac myosin activator. In some embodiments, the drug delivery device may contain or be used with Sotorasib (formerly known as AMG 510), a $KRAS^{G12C}$ small molecule inhibitor, or another product containing a $KRAS^{G12C}$ small molecule inhibitor. In some embodiments, the drug delivery device may contain or be used with Tezepelumab, a human monoclonal antibody that inhibits the action of thymic stromal lymphopoietin (TSLP), or another product containing a human monoclonal antibody that inhibits the action of TSLP. In some embodiments, the drug delivery device may contain or be used with AMG 714, a human monoclonal antibody that binds to Interleukin-15 (IL-15) or another product containing a human monoclonal antibody that binds to Interleukin-15 (IL-15). In some embodiments, the drug delivery device may contain or be used with AMG 890, a small interfering RNA (siRNA) that lowers lipoprotein(a), also known as Lp(a), or another product containing a small interfering RNA (siRNA) that lowers lipoprotein(a). In some embodiments, the drug delivery device may contain or be used with ABP 654 (human IgG1 kappa antibody), a biosimilar candidate to Stelara®, or another product that contains human IgG1 kappa antibody and/or binds to the p40 subunit of human cytokines interleukin (IL)-12 and IL-23. In some embodiments, the drug delivery device may contain or be used with Amjevita™ or Amgevita™ (formerly ABP 501) (mab anti-TNF human IgG1), a biosimilar candidate to Humira®, or another product that contains human mab anti-TNF human IgG1. In some embodiments, the drug delivery device may contain or be used with AMG 160, or another product that contains a half-life extended (HLE) anti-prostate-specific membrane antigen (PSMA)× anti-CD3 BiTE® (bispecific T cell engager) construct. In some embodiments, the drug delivery device may contain or be used with AMG 119, or another product containing a delta-like ligand 3 (DLL3) CAR T (chimeric antigen receptor T cell) cellular therapy. In some embodiments, the drug delivery device may contain or be used with AMG 119, or another product containing a delta-like ligand 3 (DLL3) CAR T (chimeric antigen receptor T cell) cellular therapy. In some embodiments, the drug delivery device may contain or be used with AMG 133, or another product containing a gastric inhibitory polypeptide receptor (GIPR) antagonist and GLP-1R agonist. In some embodiments, the drug delivery device may contain or be used with AMG 171 or another product containing a Growth Differential Factor 15 (GDF15) analog. In some embodiments, the drug delivery device may contain or be used with AMG 176 or another product containing a small molecule inhibitor of myeloid cell leukemia 1 (MCL-1). In some embodiments, the drug delivery device may contain or be used with AMG 199 or another product containing a half-life extended (HLE) bispecific T cell engager construct (BiTE®). In some embodiments, the drug delivery device may contain or be used with AMG 256 or another product containing an anti-PD-1×IL21 mutein and/or an IL-21 receptor agonist designed to selectively turn on the Interleukin 21 (IL-21) pathway in programmed cell death-1 (PD-1) positive cells. In some embodiments, the drug delivery device may contain or be used with AMG 330 or another product containing an anti-CD33×anti-CD3 BiTE® (bispecific T cell engager) construct. In some embodiments, the drug delivery device may contain or be used with AMG 404 or another product containing a human anti-programmed cell death-1(PD-1) monoclonal antibody being investigated as a treatment for patients with solid tumors. In some embodiments, the drug delivery device may contain or be used with AMG 427 or another product containing a half-life extended (HLE) anti-fms-like tyrosine kinase 3 (FLT3)×anti-CD3 BiTE® (bispecific T cell engager) construct. In some embodiments, the drug delivery device may contain or be used with AMG 430 or another product containing an anti-Jagged-1 monoclonal antibody. In some embodiments, the drug delivery device may contain or be used with AMG 506 or another product containing a multi-specific FAP×4-1BB-targeting DARPin® biologic under investigation as a treatment for solid tumors. In some embodiments, the drug delivery device may contain or be used with AMG 509 or another product containing a bivalent T-cell engager and is designed using XmAb® 2+1 technology. In some embodiments, the drug delivery device may contain or be used with AMG 562 or another product containing a half-life extended (HLE) CD19×CD3 BiTE® (bispecific T cell engager) construct. In some embodiments, the drug delivery device may contain or be used with Efavaleukin alfa (formerly AMG 592) or another product containing an IL-2 mutein Fc fusion protein. In some embodiments, the drug delivery device may contain or be used with AMG 596 or another product containing a CD3× epidermal growth factor receptor vII (EGFRvIII) BiTE® (bispecific T cell engager) molecule. In some embodiments, the drug delivery device may contain or be used with AMG 673 or another product containing a half-life extended (HLE) anti-CD33×anti-CD3 BiTE® (bispecific T cell engager) construct. In some embodiments, the drug delivery device may contain or be used with AMG 701 or another product containing a half-life extended (HLE) anti-B-cell maturation antigen (BCMA)×anti-CD3 BiTE® (bispecific T cell engager) construct. In some embodiments, the drug delivery device may contain or be used with AMG 757 or another product containing a half-life extended (HLE) anti-delta-like ligand 3 (DLL3)×anti-CD3 BiTE® (bispecific T cell engager) construct. In some embodiments, the drug delivery device may contain or be used with AMG 910 or another product containing a half-life extended (HLE) epithelial cell tight junction protein claudin 18.2×CD3 BiTE® (bispecific T cell engager) construct.

Although the drug delivery devices, assemblies, components, subsystems and methods have been described in terms of exemplary embodiments, they are not limited thereto. The detailed description is to be construed as exemplary only and does not describe every possible embodiment of the present disclosure. Numerous alternative embodiments could be implemented, using either current technology or technology developed after the filing date of this patent that would still fall within the scope of the claims defining the invention(s) disclosed herein.

The detailed description is to be construed as exemplary only and does not describe every possible embodiment of the present disclosure. Numerous alternative embodiments could be implemented, using either current technology or technology developed after the filing date of this patent that would still fall within the scope of the claims defining the invention(s) disclosed herein. Those skilled in the art will recognize that a wide variety of modifications, alterations, and combinations can be made with respect to the above described embodiments without departing from the spirit and scope of the invention(s) disclosed herein, and that such modifications, alterations, and combinations are to be viewed as being within the ambit of the inventive concept(s).

What is claimed is:

1. A system for inspecting tubular vessels post stoppering, wherein at least a portion of the tubular vessel is at least partially transparent, the system comprising:
   a digital image data acquisition device having an image sensor and a backlight, wherein the digital image data acquisition device is configured to cause the backlight to emit light having a predetermined intensity, wherein the digital image data acquisition device is configured to acquire image data from the image sensor while at least a portion of the tubular vessel and at least a portion of a plunger are positioned between the image sensor and the backlight while the backlight emits light, wherein the image data is representative of a silhouette of at least the portion of the tubular vessel and at least the portion of the plunger within the tubular vessel;
   one or more processors configured to determine a depth of the plunger within the tubular vessel based on the image data; and
   an intermediate holder, wherein an optically unimpeded portion of the intermediate holder is positioned between the backlight and at least the portion of the tubular vessel and at least the portion of the plunger.

2. The system of claim 1, wherein the image data is representative of at least a portion of a flange of the tubular vessel, and wherein the digital image data acquisition device is further configured to control an intensity of the backlight based on a transparency of at least the portion of the flange.

3. The system of claim 1, wherein the digital image data acquisition device is further configured to control an integration period of the image sensor based on the intensity of the backlight.

4. The system of claim 1, wherein the image data is representative of at least a portion of a flange of the tubular vessel, and wherein the digital image data acquisition device is further configured to control an integration period of the image sensor based on a transparency of at least the portion of the flange.

5. The system of claim 1, further comprising:
   a tray, wherein at least a portion of the tray is positioned between the backlight and at least the portion of the tubular vessel and the at least the portion of the plunger.

6. The system of claim 1, further comprising:
   a stage, wherein the stage passes the at least the portion of the tubular vessel and at least the portion of the plunger under imaging optics of the digital image data acquisition device.

7. A method of inspecting a tubular vessel, the method comprising:
   providing a plurality of tubular vessels in a tray;
   providing an intermediate holder;
   aligning the intermediate holder with the tray;
   transferring the plurality of tubular vessels from the tray to the intermediate holder;
   placing the plurality of tubular vessels and the intermediate holder between an image sensor and a backlight; and
   acquiring image data from the image sensor while at least a portion of the tubular vessel and at least a portion of a plunger are positioned between the image sensor and the backlight while the backlight emits light, wherein the image data is representative of a silhouette of at least the portion of the tubular vessel and at least a portion of the plunger within the tubular vessel,
   wherein the image data is representative of a plurality of prefilled syringes in the intermediate holder, wherein the intermediate holder includes a plurality of optically unimpeded areas, and wherein each prefilled syringe is aligned with at least one respective optically unimpeded area.

8. The method of claim 7, further comprising:
   determining a depth of the plunger within the tubular vessel based on the image data.

9. The method of claim 7, further comprising:
   a removal tool, wherein transferring the plurality of tubular vessels from the tray to the intermediate holder includes using the removal tool to dislodge the plurality of tubular vessels from the tray.

10. The method of claim 7, wherein the intermediate holder includes a plurality of V-block receptacles, and wherein the tubular vessels are self-centering in a respective V-block.

11. A non-transitory computer-readable medium having computer-readable instructions stored thereon that, when executed by a processor, cause the processor to implement a tubular vessel inspection post stoppering, wherein at least a portion of the tubular vessel is at least partially transparent, the computer-readable medium comprising:
   a backlight control module that, when executed by the processor, causes the processor to cause a backlight to emit light having a predetermined intensity; and
   a digital image data acquisition module that, when executed by the processor, causes the processor to acquire image data from an image sensor while at least a portion of the tubular vessel and at least a portion of a plunger within the tubular vessel are positioned between the image sensor and the backlight while the backlight emits light, wherein the image data is representative of a silhouette of at least the portion of the tubular vessel and the at least the portion of the plunger,
   wherein the image data is representative of at least a portion of a flange of the tubular vessel, and wherein an integration period of the image sensor is based on a transparency of at least the portion of the flange.

12. The computer-readable medium of claim 11, further comprising:
an inspection data generation module that, when executed by the processor, causes the processor to generate inspection data based on the image data, wherein the inspection data is representative of a distal edge of the tubular vessel.

13. The computer-readable medium of claim 11, further comprising:
an inspection data generation module that, when executed by the processor, causes the processor to generate inspection data based on the image data, wherein the inspection data is representative of a distal edge of the plunger.

14. The computer-readable medium of claim 11, further comprising:
an inspection data generation module that, when executed by the processor, causes the processor to generate inspection data based on the image data, wherein the inspection data is representative of a depth of the plunger within the tubular vessel.

15. The computer-readable medium of claim 11, wherein the image data is representative of at least a portion of a flange of the tubular vessel, and wherein the processor controls an intensity of the backlight based on a transparency of at least the portion of the flange.

16. The computer-readable medium of claim 11, wherein an integration period of the image sensor is based on the predetermined intensity of the backlight.

17. The computer-readable medium of claim 11, wherein the image data is representative of first image data acquired at a first time threaded together with second image data acquired at a second time, and wherein the image data is representative of a mosaic.

18. A system for inspecting tubular vessels post stoppering, wherein at least a portion of the tubular vessel is at least partially transparent, the system comprising:
a digital image data acquisition device having an image sensor and a backlight, wherein the digital image data acquisition device is configured to cause the backlight to emit light having a predetermined intensity, wherein the digital image data acquisition device is configured to acquire image data from the image sensor while at least a portion of the tubular vessel and at least a portion of a plunger are positioned between the image sensor and the backlight while the backlight emits light, wherein the image data is representative of a silhouette of at least the portion of the tubular vessel and at least the portion of the plunger within the tubular vessel; and
one or more processors configured to determine a depth of the plunger within the tubular vessel based on the image data,
wherein the image data is representative of at least a portion of a flange of the tubular vessel, and wherein the digital image data acquisition device is further configured to control an integration period of the image sensor based on a transparency of at least the portion of the flange.

19. A non-transitory computer-readable medium having computer-readable instructions stored thereon that, when executed by a processor, cause the processor to implement a tubular vessel inspection post stoppering, wherein at least a portion of the tubular vessel is at least partially transparent, the computer-readable medium comprising:
a backlight control module that, when executed by the processor, causes the processor to cause a backlight to emit light having a predetermined intensity; and
a digital image data acquisition module that, when executed by the processor, causes the processor to acquire image data from an image sensor while at least a portion of the tubular vessel and at least a portion of a plunger within the tubular vessel are positioned between the image sensor and the backlight while the backlight emits light, wherein the image data is representative of a silhouette of at least the portion of the tubular vessel and the at least the portion of the plunger,
wherein the image data is representative of a plurality of prefilled syringes in an intermediate holder, wherein the intermediate holder includes a plurality of optically unimpeded areas, and wherein each prefilled syringe is aligned with at least one respective optically unimpeded area.

* * * * *